United States Patent [19]

Kurosawa et al.

[11] 3,959,234

[45] May 25, 1976

[54] METHOD OF POLYMERIZING CARBONIMIDE NORBORNENE DERIVATIVES

[75] Inventors: Shigeru Kurosawa; Takashi Ueshima; Shoichi Kobayashi, all of Yokohama, Japan

[73] Assignee: Showa Denko Kabushiki Kaisha, Tokyo, Japan

[22] Filed: Nov. 1, 1974

[21] Appl. No.: 520,096

[30] Foreign Application Priority Data

Nov. 5, 1973 Japan............................ 48-123329

[52] U.S. Cl. .................... 260/78 UA; 204/159.22; 260/32.6 NA; 260/DIG. 43; 526/108; 526/109; 526/110; 526/227; 526/230; 526/208; 526/209; 526/213; 526/259; 526/281; 526/290; 526/291

[51] Int. Cl.² ...................................... C08G 69/00

[58] Field of Search ................................. 260/78 U

[56] References Cited

UNITED STATES PATENTS

| | | | |
|---|---|---|---|
| 3,294,767 | 12/1966 | Lundberg et al. | 260/78 UA |
| 3,330,815 | 7/1967 | McKeon et al. | 260/78 UA |

FOREIGN PATENTS OR APPLICATIONS

| | | | |
|---|---|---|---|
| 1,594,934 | 7/1970 | France | |

*Primary Examiner*—Harold D. Anderson
*Attorney, Agent, or Firm*—Kemon, Palmer & Estabrook

[57] ABSTRACT

A method of polymerizing imide type norbornene derivatives which comprises the ring-opening polymerization of imide type norbornene derivatives containing at least one N-substituted cyclic imide group or a mixture consisting of said norbornene derivatives as the main component and cycloolefins in the presence of a catalytic system comprising organic aluminum compounds and tungsten and/or molybdenum compounds.

49 Claims, No Drawings

METHOD OF POLYMERIZING CARBONIMIDE NORBORNENE DERIVATIVES

BACKGROUND OF THE INVENTION

This invention relates to a method of polymerizing norbornene derivatives and more particularly to a method of carring out the ring-opening polymerization of norbornene derivatives having at least one N-substituted cyclic imide group. An article by R. E. Rinechart appearing in the Journal of Polymer Science (1969) Part C, No. 27, pages 7 to 25 and the Japanese Patent Publications Nos. 22705/67 and 7552/68 point out that a new type of polymer can be obtained by subjecting to ring-opening polymerization cycloolefins such as cyclooctene, cyclopentene, cyclobutene, cyclooctadiene and norbornene in an organic solvent selected from aromatic hydrocarbons such as toluene, aliphatic hydrocarbons such as n-heptane and lower alcohols such as methyl alcohol, using a catalyst prepared from halides of noble metals such as ruthenium, osmium and iridium or halides of transition metals such as titanium, molybdenum, tungsten and vanadium.

However, a joint report by Francis W. Michelotti and William P. Keaveney appearing in the Journal of Polymer Science (1965), Part A, vol 3, pages 895 to 905 discloses that 5-chloromethyl-2-norbornene, a derivative of norbornene, can indeed be formed into fibrous polymer when subjected to ring-opening polymerization, using a catalyst of ruthenium compounds, whereas 5-cyano-2-norbornene, namely, 5-cyanobicyclo[2, 2, 1]-heptene-2 can not provide a polymer even when subjected to ring-opening polymerization, using a catalyst of compounds of ruthenium, osmium or iridium. As seen from the foregoing description, some of the derivatives of cycloolefins, particularly those of norbornene can be made into polymers by ring-opening polymerization, using a certain kind of a catalytic system, whereas the others of said norbornene derivatives can not be expected to admit of ring-opening polymerization even when the same kind of catalytic system is used.

The present inventors have conducted studies on the ring-opening polymerization of cyano- and ester-substituted norbornene derivatives. As the result, it has been found that polymers can be prepared by ring-opening polymerization of the above-mentioned norbornene derivatives, using a catalytic system consisting of compounds of tungsten and/or those of molybdenum and organic aluminum compounds. It has also been disclosed that said polymer can not be produced by ring-opening polymerization of cyano- or ester-substituted norbornene derivatives, using a catalytic system consisting of compounds of titanium and/or those of vanadium and organic aluminum compounds. (Japanese Patent Application Disclosure Nos. 100500/73, 67999/74 and 77999/74).

It is an object of this invention to provide a method of carrying out the ring-opening polymerization of norbornene derivatives having at least one N-substituted cyclic imide group (hereinafter referred to as "imide type norbornene derivatives") in the presence of a catalytic system consisting of organic aluminum compounds and at least one compound selected from the group consisting of compounds of tungsten and those of molybdenum. The ring-opening polymerization of said norbornene derivatives can also be effected in the presence of a catalytic system prepared by mixing the above-mentioned catalytic system with at least one compound selected from the group consisting of water, peroxides, epoxides, organic halides, acetal compounds, orthoformic acid esters, orthocarboxylic acid esters, alcoholic compounds and phenolic compounds. Ring-opening polymerization by the above-mentioned process of a mixuture of imide type norbornene derivatives and other cycloolefins provides copolymers of these components.

The polymers and copolymers of this invention obtained by the above-mentioned method are prominent not only in impact strength but also in tensile strength, high melting and adhesive property.

The present inventors have elaborated to find polymers which can be obtained by ring-opening polymerization of imide type norbornene derivatives in the presence of a catalytic system consisting of a mixture of organic aluminiu compounds and compounds of tungsten and/or those of molybdenum or a catalytic system consisting of said mixture to which there is added at least one compound (hereinafter referred to as a "a third component") selected from the group consisting of water, peroxides, epoxides, organic halides, acetal compounds, orthoformic acid esters, orthocarboxylic acid esters, alcoholic compounds and phenolic compounds.

The method of polymerizing imide type norbornene derivatives is already known as set forth in the specification of the French Pat. No. 1,594,934. This French Patent polymerization method consists in polymerizing imide type norbornene derivatives whose chemical composition may be expressed by the following general formula (I)

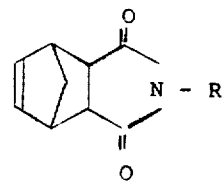

(where R denotes hydrogen atom, alkyl radical, cycloalkyl radical or aryl radical) in the presence of a catalyst, halides of noble metals, such as ruthenium, using a large amount of alcohol as a reducing agent.

The polymerization method of this invention fundamentally differs from the above-mentioned French Patent method in that in the former method polymerizations are conducted in an aprotic solvent, using the so-called Ziegler-Natta catalyst, whereas in the French patent method polymerizations are performed using a large amount of protic solvent, for example, alcohol (at the larger rate than 10 mols per mol of catalyst). With the method of this invention, norbornene derivatives can not be polymerized in the presence of a large amount of protic solvent. Conversely by the method of the aforesaid French Pat. No. 1,594,934 polymerizations do not occur in an aprotic solvent as shown in this invention. The polymerization catalyst used in said French Patent restrictively consists of halides (mainly hydrates of chlorides) of noble metals, for example, iridium, osmium and ruthenium. In contrast, the polymerization catalyst adapted in this invention is formed of compounds of a transition metal, namely, tungsten or molybdenum, and organic aluminum compounds and can further be diversified into numerous catalytic systems displaying many characteristics by incorporating a proper third component. In other words, application of a properly selected one of these catalytic systems can suitably vary the factors which largely affect the quality of the resultant polymer of norbornene derivatives, such as the cis-trans ratio of a double bond contained in said polymer and the reduced viscosity thereof. This invention is further characterized in that a polymer of norbornene derivatives can have its molecular weight controlled by adding acyclic olefins or diolefins to the reaction system. This feature bears a very great importance in that where a polymer of norbornene derivatives is manufactured on an industrial scale, one of the factors largely affecting, for example, the mechanical properties and moldability of the polymer can be easily controlled.

Imide type norbornene derivatives used in a monomer in this invention can be prepared through two routes, i.e., from norbornene derivatives having cyclic carboxylic anhydride and primary amines and from norbornene derivatives having primary amino group and cyclic carboxylic anhydrides, by a process resembling that which was proposed by M. P. Cava et al. in making N-phenyl maleimide (refer to "Organic Syntheses" by John D. Roberts, Vol. 41, Pages 93 to 95, 1961, published by John Wiley and Sons, Inc.). Norbornene derivatives having cyclic carboxylic anhydride, one component used in the former route, can be easily prepared by subjecting cyclopentadiene or dicyclopentadiene and olefinic compounds having cyclic carboxylic anhydride to the Diels-Alder reaction (refer to "Organic Reactions" by H. L. Holmes, Vol. IV, Pages 60 to 173, 1948, published by John Wiley and Sons, Inc.).

Imide type norbornene derivatives obtained by the abovementioned processes may be roughly divided into two types One type is imide type norbornene derivatives obtained from norbornene derivatives having cyclic carboxylic anhydride group (hereinafter referred to as "A-type imide type type norbonene derivatives"). The other type is imide type norbornene derivatives obtained from norbornene derivatives having amino radical (—$NH_2$) and cyclic acid anhydrides (hereinafter referred to as "B-type imide type norbornene derivatives").

Typical of the A-type imide type norbornene derivatives are those whose chemical structures may by expressed by the following general formulas:

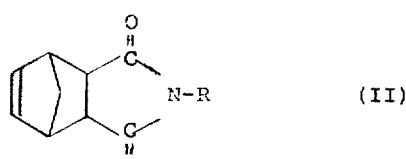
(II)

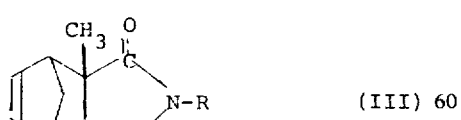
(III)

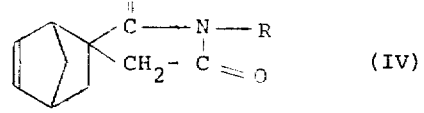
(IV)

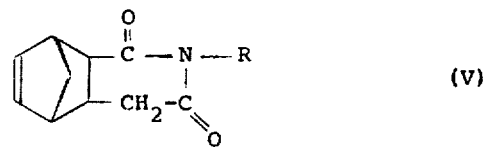
(V)

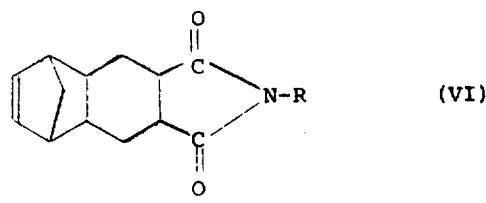
(VI)

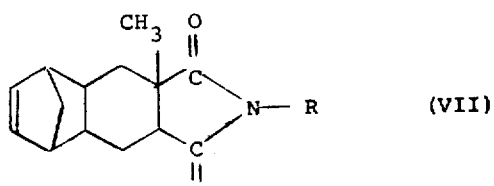
(VII)

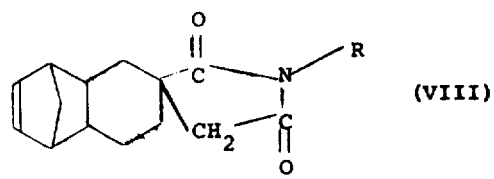
(VIII)

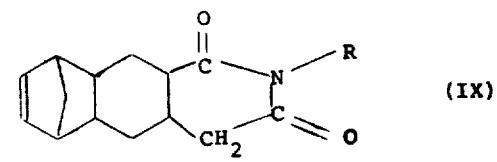
(IX)

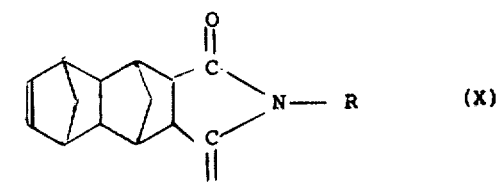
(X)

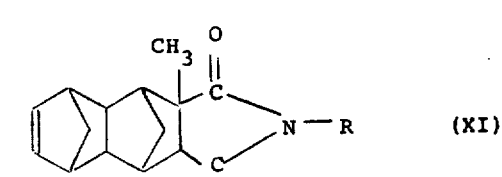
(XI)

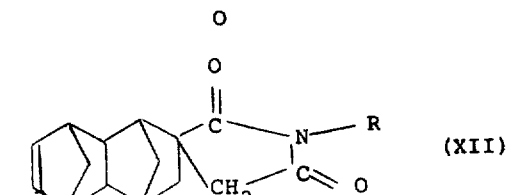
(XII)

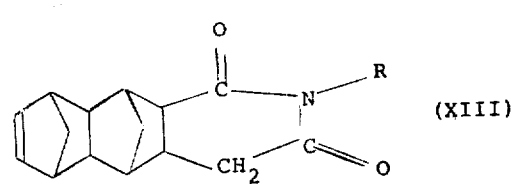
(XIII)

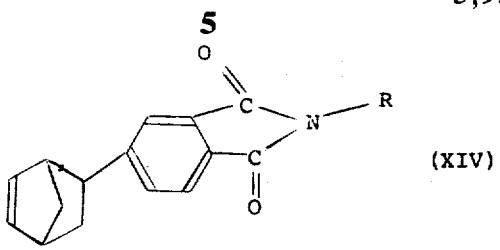

(XIV)

where:

R = an alkyl radical having 1 to 20 carbon atoms, cycloalkyl radical having 4 to 20 carbon atoms, aryl radical having 6 to 20 carbon atoms or alkyl-substituted aryl radical having 7 to 20 carbon atoms, —(CH$_2$)$_2$COOR' (n is an integer of 1 to 10, and R' is an alkyl radical having 1 to 10 carbon atoms, cycloalkyl radical having 4 to 10 carbon atoms or aryl radical having 6 to 10 carbon atoms), or —(CH$_2$)$_n$OCOR' (n is an integer of 1 to 10, and R' is an alkyl radical having 1 to 10 carbon atoms, cycloalkyl radical having 4 to 10 carbon atoms or aryl radical having 6 to 10 carbon atoms)

The N-substituent of the imide type norbornene derivatives whose chemical structures are expressed by the above-listed general formulas from (II) to (XIV) includes a hydrocarbon radical selected from the group consisting of an alkyl radical having 1 to 20 carbon atoms, alkenyl radical having 2 to 20 carbon atoms, cycloalkyl radical having 4 to 20 carbon atoms and aryl radical having 6 to 20 carbon atoms, and a substituent containing an ester radical. The hydrocarbon radical includes a methyl radical, ethyl radical, n-propyl radical, isopropyl radical, n-butyl radical, isobutyl radical, hexyl radical, octyl radical, allyl radical, cyclohexyl radical, 4-methyl cyclohexyl radical, phenyl radical, and tolyl radical. The substituent containing an ester radical includes an acetoxymethyl radical, benzoxymethyl radical, stearoxymethyl radical, β-acetoxyethyl radical, ω-acetoxypentyl radical, methoxycarbonyl methyl radical, β-methoxycarbonyl ethyl radical, phenoxycarbonyl methyl radical, ω-ethoxycarbonyl-n-butyl radical, ω-methoxycarbonyl-n-pentyl radical and ω-cyclohexyloxycarbonyln-pentyl radical.

The general formula (II) represents N-substituted-3, 6-methylene-1, 2, 3, 6-tetrahydro-cis-phthalimides. The typical compounds thereof include N-methyl-3, 6-methylene-1, 2, 3, 6-tetrahydro-cis-phthalimide; N-ethyl-3, 6-methylene-1, 2, 3, 6-tetrahydro-cis-phthalimide; N-normal propyl-3, 6-methylene-1, 2, 3, 6-tetrahydro-cisphthalimide; N-isopropyl-3, 6-methylene-1, 2, 3, 6-tetrahydrocis-phthalimide; N-normal butyl-3, 6-methylene-1, 2, 3, 6-tetrahydro-cis-phthalimide; N-t-butyl-3, 6-methylene-1, 2, 3, 6-tetrahydro-cis-phthalimide; N-amyl-3, 6-methylene1, 2, 3, 6-tetrahydro-cisphthalimide; N-hexyl-3, 6-methylene-1, 2, 3, 6-tetrahydro-cis-phthalimide; N-octyl-3, 6-methylene-1, 2, 3, 6-tetrahydro-cis-phthalimide; N-decyl-3, 6-methylene-1, 2, 3, 6-tetrahydro-cis-phthalimide; N-dodecyl-3, 6-methylene-1, 2, 3, 6-tetrahydro-cisphthalimide; N-cyclohexyl-3, 6-methylene-1, 2, 3, 6-tetrahydro-cis-phthalimide; N-(4-methylcyclohexyl)-3, 6-methylene-1, 2, 3, 6-tetrahydro-cis-phthalimide; N-phenyl-3, 6-methylene-1, 2, 3, 6-tetrahydro-cis-phthalimide; N-(4-methylphenyl)-3, 6-methylene-1, 2, 3, 6-tetrahydrocisphthalimide; N-(3-methylphenyl)-3, 6-methylene-1, 2, 3, 6-tetrahydro-cis-phthalimide; N-(4-ethyl phenyl)-3, 6-methylene-1, 2, 3, 6-tetrahydro-cis-phthalimide; N-methoxycarbonyl methyl-3, 6-methylene-1, 2, 3, 6-tetrahydro-cis-phthalimide; N-ethoxycarbonyl methyl-3, 6-methylene-1, 2, 3, 6-tetrahydrocis-phthalimide; N-butyloxycarbonyl methyl-3, 6-methylene-1, 2, 3, 6-tetrahydro-cis-phthalimide; and N-acetoxy-3, 6-methylene-1, 2, 3, 6-tetrahydro-cis-phthalimide.

The general formula (III) denotes N-substituted-3, oxide, -methylene-1-methyl-1, 2, 3, 6-tetrahydro-cis-phthalimides. The typical compounds thereof are those in which the above-mentioned N-substitution is effected, as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (IV) shows bicyclo [2, 2, 1]-hepta-2-ene-5-spiro-3'-(N-substituted succinimides). The typical compounds thereof are those in which the above-mentioned N-substitution is effected, as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (V) indicates N-substituted-2-aza-1, 3-dioxo-5, 8-methano-1, 2, 3, 4, 4a, 5, 8, 8a-octahydronaphthalenes. The typical compounds thereof are those in which the above-mentioned N-substitution is effected as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (VI) represents N-substituted-5, 8-methano-1, 2, 3, 4, 4a, 5, 8, 8a-octahydronaphthalene-2, 3-dicarboxyimides. The typical compounds thereof are those in which the above-mentioned N-substitution is effected as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (VII) shows N-substituted-5, 8-methano-2-methyl-1, 2, 3, 4, 4a, 5, 8, 8a-octahy-dronaphthalene-2, 3-dicarboxyimides. The typical compounds thereof are those in which the above-mentioned N-substitution is effected, as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (VIII) indicates 1, 4-methano-1, 4, 4a, 5, 6, 7, 8, 8a-actahydronapthalene-6-spiro-3'-(N-substituted succinimides). The typical compounds thereof are those in which the above-mentioned N-substitution is effected, as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (IX) denotes N-substituted-2-aza-1,3-dioxo-5-8-methano-1,2,3,4,4a,,5,8,8a,9-,9a,10,10a-dodecyclhydroanthracenes. The typical compounds thereof are those in which the above-mentioned N-substitution is effected, as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (X) represents N-substituted-1, 4, 5, 8-dimethano-1, 2, 3, 4, 4a, 5, 8, 8a-octahydronaphthalene-2, 3-dicarboxyimides. The typical compounds there of are those in which the above-mentioned N-substitution is effected, as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (XI) indicates N-substituted-1, 4, 5, 8-dimethano-2-methyl-1, 2, 3, 4, 4a, 5, 8, 8a-octaahydronaphthalene-2, 3-dicarboxyimides. The typical compounds thereof include those in which the above-mentioned N-substitution is effected, as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (XII) shows 1, 4, 5, 8-dimethano-1, 4, 4a, 5, 6, 7, 8, 8a-octahydronaphthalene-6-spiro-3'-(N-substituted succinimides). The typical compounds thereof are those in which the above-mentioned N-substitution is effected, as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (XIII) represents N-substituted-2-aza-5, 8, 9, 10-dimethano-1 3-dioxo-1, 2, 3, 4, 4a, 5, 8, 8a, 9, 9a, 10, 10a-dodecahydroanthracenes. The typical compounds thereof are those in which the above-mentioned N-substitution is effected, as in the typical compounds of the general formula (II), by an alkyl radical having 1 to 20 carbon atoms, alkenyl radical having 2 to 20 carbon atoms, cycloalkyl radical having 4 to 20 carbon atoms, aryl radical having 6 to 20 carbon atoms or a substituent containing an ester radical.

The general formula (XIV) shows N-substituted-4-(5-bicyclo[2, 2, 1]-hepta-2-enyl) phthalimides. The typical compounds thereof are those in which the above-mentioned N-substitution is effected, as in the typical compounds of the general formula (II), by an alkyl radical having 1 to 20 carbon atoms, alkenyl radical having 2 to 20 carbon atoms, aryl radical having 6 to 20 carbon atoms or a substituent containing an ester radical.

Typical of the B-type imide type norbornene derivatives are those whose chemical structures may be expressed by the following general formulas:

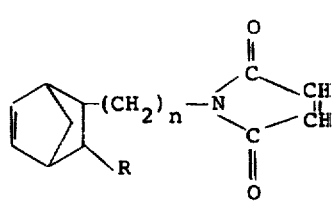

(XV)

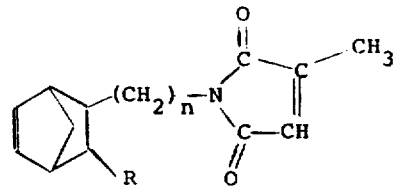

(XVI)

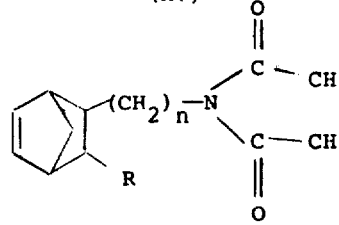

(XVII)

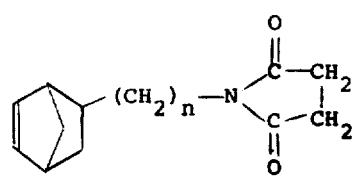

(XVIII)

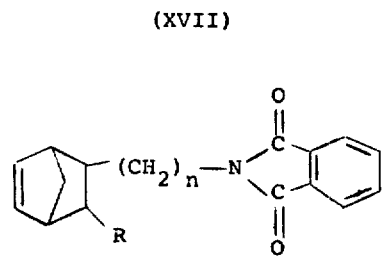

(XIX)

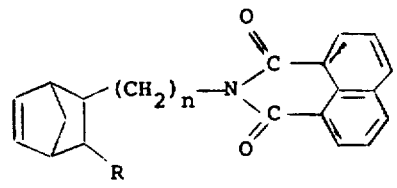

(XX)

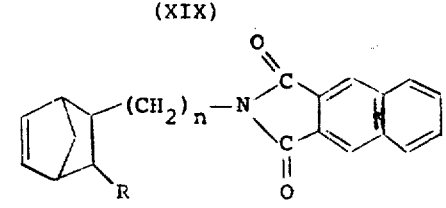

(XXI)

where $n$ is an integer of 1 to 20 and R is a hydrogen atom or an alkyl radical having 1 to 20 carbon atoms.

The substituent R of the imide type norbornene derivatives whose chemical structures are expressed by the general formulas of (XV) to (XXI) is a hydrogen atom or an alkyl radical having 1 to 20 carbon atoms and the norbornene ring and imide ring are connected together by 1 to 20 methylene radicals.

The alkyl radical having 1 to 20 carbon atoms includes a methyl radical, ethyl radical, n-propyl radical, isopropyl radical, n-butyl radical, n-hexyl radical and n-octyl radical.

The general formula (XV) represents N-[ω-(5-norborna-2-enyl)alkyl] maleimides. The typical compounds thereof are N-(5-norborna-2-enyl) methyl maleimide; N-[2-(5-norborna-2-enyl) ethyl] maleimide; N-]3-(5-norborna-2-enyl) propyl] maleimide; N-[4-(5-norborna-2-enyl) butyl] maleimide; N-[5-(5-norborna-2-enyl) pentyl] maleimide; N-[6-(5-norborna-2-enyl) hexyl] maleimide; N-[8-(5-norborna-2-enyl) octyl] maleimide; N-[10-(5-norborna-2-enyl) decyl] maleimide; N-[12-(5-norborna-2-enyl) dodecyl] maleimide; N-(6-methyl-5-norborna-2-enyl) methyl maleimide; N-[2-(6-methyl-5-norborna-2-enyl) ethyl] maleimide; N-[3-(6-methyl-5-norborna-2-enyl) propyl] maleimide; N-[4-(6-methyl-5-norborna-2-enyl) butyl] maleimide; N-[5-(6-methyl-5-norborna-2enyl) pentyl] maleimide; N-[6-(6-methyl-5-norborna-2-enyl) hexyl] maleimide; N-[10-(6-methyl-5-norborna-2-enyl) decyl] maleimide; N-(6-ethyl-5-norborna-2-enyl) methyl maleimide; N-[2-(6-ethyl-5-norborna-2-enyl) ethyl] maleimide; N-[3-(6-ethyl-5-norborna-2-enyl)propyl] maleimide; N-[4-(6-ethyl-5-norborna-2-enyl) butyl] maleimide; N-[6-(6-ethyl-5-norborna-2-enyl) hexyl] maleimide; N-[8-(6-ethyl-5-norborna-2-enyl) octyl] maleimide; N-[12-(6-ethyl-5-norborna-2-enyl) dodecyl] maleimide; N-(6-propyl-5-norborna-2-enyl) methyl maleimide; N-[2-(6-propyl-5-norborna-2-enyl) ethyl] maleimide; N-[4-(6-propyl-5-norborna-2-enyl) butyl] maleimide; N-[7-(6-propyl-5-norborna-2-enyl) heptyl] maleimide; N- [11-(6-propyl-5-norborna-2-enyl) undecyl] maleimide; N-(6-butyl-5-norborna-2-enyl)methyl maleimide; N-[2-(6-butyl-5-norborna-2-enyl) ethyl] maleimide; N-[4-(6-butyl-5-norborna-2-enyl) butyl] maleimide; N-[6-(6-butyl-5-norborna-2-enyl) hexyl] maleimide; N-[12-(6-butyl-5-norborna-2-enyl) dodecyl] maleimide; N-(6-hexyl-5-norborna-2-enyl) methyl maleimide; N-[2-(6-hexyl-5-norborna-2-enyl) ehtyl] maleimide; N-[4-(6-hexyl-5-norborna-2-enyl) butyl] maleimde; N-[6 -(6-hexyl-5-nroborna-2-enyl) hexyl] maleimide; N-(6-dodecyl-5-norborna-2-enyl) methyl maleimide; N-[2-(6-dodecyl-5-norborna-2-enyl) ethyl] maleimide; N-[4-(6-dodecyl-5-norborna-2-enyl) butyl] maleimde; and N-[6-(6-dodecyl-5-norborna-2-enyl) hexyl] maleimide.

The general formula (XVI) shows N-[ω-(5-norborna-2-enyl) alkyl citraconimides. The typical compounds thereof are said citraconimides in which the position of 5 of norbornene is substituted by a hydrogen atom or an alkyl radical having 1 to 20 carbon atoms as in the typical compounds of the general formula (XV).

The general formula (XVII) indicates N-[ω-(5-norborna2-enyl) alkyl] glutaconimides. The typical compounds thereof are said glutaconimides in which the position of 5 of norbornene is substituted by a hydrogen atom or an alkyl radical having 1 to 20 carbon atoms as in the typical compounds of the general formula (XV).

The general formula (XVIII) represents N-[ω-(5-norborna-2-enyl)alkyl] succinimides. The typical compounds thereof are said succinimides in which the position of 5 of norbornene is substituted by a hydrogen atom or any alkyl radical having 1 to 20 carbon atoms as in the typical compounds of the general formula (XV).

The general formula (XIX) denotes N-[ω-(5-norborna-2-enyl) alkyl] phthalimides. The typical compounds thereof are said phthalimides in which the position of 5 of norbornene is substituted by a hydrogen atom or any alkyl radical having 1 to 20 carbon atoms as in the typical compounds of the genenral formula (XV).

The general formula (XX) shows N-[ω-(5-norborna-2-enyl) alkyl] naphthalene-1, 8-dicarboxyimides in which the position of 5 of norbornene is substituted by a hydrogen atom or an alkyl radical having 1 to 20 carbon atoms as in the typical compounds of the general formula (XV).

The general formula (XXI) represents N-[ω-(5-norborna-2-enyl)alkyl] naphthalene-2, 3-dicarboxyimides. The typical compounds thereof are said dicarboxyimides in which the position of 5 of norbornene is substituted by a hydrogen atom or any alkyl radical having 1 to 20 carbon atoms as in the typical compounds of the general formula (XV).

The above-mentioned A- and B-type imide type norbornene derivatives are each divided into the endo and exo forms according to the position occupied by the substituent in said derivatives. These isomers can be separated by precision distillation or fractional recrystallization. For the object of this invention, the isomers may be applied in a separated or nonseparated state. It is possible to use a single or two or more types of the above-mentioned imide type norbornene derivatives. Further it is possible to carry out the ring-opening polymerization of the A- and B-type imide type norbornene derivatives alone or in combination with other cyclooefins.

Other cycloolefins used as comonomers in producing the above-mentioned copolymers typically include monocyclic olefins such as cyclopentene, cycloheptene, cyclooctene and cyclododecene; nonconjugated cyclopolyenes such as 1, 5-cyclooctadiene, 1, 5, 9-cyclododecatriene, 1-chloro, 1, 5-cyclooctadiene and norbornadiene (bicyclo[2,2,1]-hepta-2, 5-diene); cyanopsubstituted norbornene derivatives such as 5-cyano bicylo [2,2,1]-heptene-2,5-cyano-5methyl bicyclo [2,2,1]-heptene-2,5-cyano-5-n-octyl bicyclo [2,2,1]-heptene2,5,5,-dicyano bicyclo[2,2,1]-heptene-2, 5,6-dicyano bicyclo [2,2,1]-heptene-2, 5-cyano-6-phenyl bicyclo[2,2,1]-heptene-2, and a mixture of 5-ω-cyano-n-heptyl, 6-n-2-octenyl bicyclo[2,2,1]-heptene-2 and 5-ω-cyano-2-decenyl, 6-n-pentyl bicyclo [2,2,1]-heptene-2, ester-substituted norborene derivatives such as 5-methoxy carbonyl-bicyclo [2,2,1] heptene-2, 5-methoxycarbonyl bicyclo[2,2,1]-heptene-2, 5-butoxycarbonyl-bicyclo[2,2,1]-heptene12, 5-allyloxycarbonyl-bicyclo[2,2,1]-heptene-2, 5-methyl-5-methoxycarbonyl-bicyclo[2,2,1]-heptene-2, 5 -hexyloxycarbonyl-6-methyl-bicyclo[2,2,1]heptene-2, 5-ethoxycarbonyl-6-phenyl-bicyclo[2,2,1]-heptene-2, 5-heptyl-6-octyloxycarbonyl bicyclo[2,2,1]-heptene-2, 5-methoxycarbonyl-6-methoxycarbonyl methyl-bicyclo[2,2,1]-heptene-2, 5, 6-dimethoxycarbonyl methyl-bicyclo[2,2,1]-heptene-2, 5, 6-dimethoxycarbonylbicyclo[2,2,1]-heptene-2,5,6-diethoxycarbonyl-bicyclo[2,2,1]-heptene-2,5,6-dibutoxycarbonyl-bicyclo[2,2,1]-heptene-2, 5-methyl-6,6-dimethoxycarbonyl-bicyclo[2,2,1]-heptene-2, 5-ω-methoxycarbonyl-heptyl-6-octyl-bicyclo[2,2,1]-heptene-2, 5-ω-methoxycarbonyl-2-decenyl-6-pentyl-bicyclo [2,2,1]-heptene-2,5-ω-methoxycarbonyl heptyl-6-2-octanyl-bicyclo[2,2,1]heptene-2, 5-acetoxymethyl-bicyclo[2,2,1]-heptene-2, 5-acetoxy-bicyclo[2,2,1]-heptene-2, 5-propionoxymethylbicyclo[2,2,1]-heptene-2, and 5-stearoxymethyl-bicyclo[2,2,1]-heptene-2, ether type norbornene derivatives such as 5-methoxybicyclo[2,2,1]-heptene-2, 5-ethoxy-bicyclo[2,2,1]-heptene2, 5-n-propoxy-bicyclo[2,2,1]-heptene-2, 5-isopropoxybicyclo[2,2,1]-heptene-2, 5-n-butoxy-bicyclo[2,2,1]-heptene 5-cyclohexoxybicyclo[2,2,1]-heptene-2, 5-methoxymethyl-bicyclo[2,2,1]heptene-2, 5-butoxymethyl-bicyclo[2,2,1]-heptene-2, 5-methoxy-6-methoxymethyl-bicyclo[2,2,1]-heptene-2, and 5-phenoxy-bicyclo[2,2,1]-heptene-2; acid anhydride type norbornene derivatives such as 3,6-methylene-1,2,3,6-tetrahydrocis-phthalic anhydride, 6-(5-carboxy-bicyclo[2,2,1]-hepta-2-enyl) acetic anhydride, 3,6-methano-1-methyl-1,2,3,6-tetrahydro-cis-phthalic anhydride, 2-oxa-1,4-dioxo-5,8-methano-1,2,3,4,4a,5,8,8a-octahydronaphthalene, 5,8-methano-1,2,3,4a,5,8,8a-octahydro naphthalene-1,2-dicarboxylic anhydride, 5,8-methano-1-methyl-1,2,3,4a,5,8,8a-octahydronaphthalene-2,3-dicarboxylic anhydride, 4,7-methano-1-methyl-1,2,3,3a,4,7,7a,8-naphthalene-1,2-dicarboxylic anhydride,1,4,5,8-dimethano-1,2,3,4,4a5,8,8a-octahydronaphthalene-2,3-dicarboxylic anhydride, 2-oxa-1,3-dioxo-1,2,3,,4,4a,5,8,8a,9,10,-10a-dodecahydroanthracene and 4-(5-bicyclo [2,2,1]-hepta-2-enyl) phthalic anhydride; halogen type norbornene derivatives such as 5-chloro-bicyclo[2,2,1]-heptene-2,5,5,-dichloro-bicyclo[2,2,1]-heptene-2, 5,6-dichlorobicyclo[2,2,1]-heptene-2, 5,5,6-trichloro-bicyclo[2,2,1]-heptene-2, 5,5,6,6-tetrachloro-bicyclo[2,2,1]-heptene-2, 5-chloro-methyl-bicyclo[2,2,1]-heptene-2, 5,6-di(chloromethyl)bicyclo[2,2,1]-heptene-2, 5-chloro-5-methyl-bicyclo[2,2,1]-heptene-2, 5-chloromethyl-6-methyl-bicyclo[2,2,1]-heptene-2, 5-(β-chloroethyl)-bicyclo[2,2,1]-heptene-2, 5-(α-chloroethyl)-bicyclo[2,2,1]-heptene-2, 5-(β-chloropropyl)-bicyclo[2,2,1]-heptene-2, 5-(γ-chloropropyl)-bicyclo[2,2,1]-heptene-2, 5-(β-chloroethyl)-6-methyl-bicyclo-[2,2,1]-heptene-2 and 5-chloromethyl-6-ethyl-bicyclo[2,2,1]-heptene-2; and other halogen type norbornene derivatives obtained by substituting bromine for the chlorine included in the above-listed halogen type norbornene derivatives; amide type norbornene derivatives such as N,N-dimethyl-bicyclo[2,2,1]-heptene-2-carbonamide-5, N-methyl-N-ethyl-bicyclo[2,2,1]-heptene-2-carbonamide-5, N,N-di-n-propyl-bicyclo[2,2,1]-heptene-2-carbonamide-5, N,N-dicyclo-hexyl-bicyclo[2,2,1]-heptene-2-carbonamide-5, N,N-diphenyl-bicyclo[2,2,1]-heptene-2-carbonamide-5, N,N-dibenzyl-bicyclo[2,2,1]-heptene-2-carbonamide-5, N,N-dimethyl-5-methyl-bicyclo[2,2,1]-heptene-2-carbonamide-5, N,N-diethyl-6-methyl-bicyclo[2,2,1]-heptene-2-carbonamide-5 and N,N,N',N'-tetramethyl-bicyclo[2,2,1]-heptene-2-carbonamide-5; aromatic norbornene derivatives such as 5-phenylbicyclo[2,2,1]-heptene-2, 5-methyl-5-phenyl-bicyclo[2,2,1]-heptene-2, 5-ethyl-5-phenyl-bicyclo[2,2,1]-heptene-2, 5-(p-tolyl) bicyclo[2,2,1]-heptene-2, 5-(p-t-butyl-phenyl)-bicyclo[2,2,1]-heptene-2, 5-α-napht-hyl-bicyclo[2,2,1]-heptene-2, and 5-α-anthryl-bicyclo[2,2,1]-heptene-2; aromatic dimethano-octahydronaphthalene derivatives such as 2-phenyl-1,4; 5,8-dimethano-1,2,3,4,4a,5,8,8a-octahydronaphthalene, 2-methyl-2-phenyl-1,4; 5,8-dimethano-1,2,3,4,4a,5,8-,8a-octahydronaphthalene, 2-ethyl-2-phenyl-1,4; 5,8-dimethano-1,2,3,4,4a,5,8,8a-octahydronaphthalene, 2-(p-tolyl)-1,4; 5,8-dimethano-1,2,3,4,4a5,8,8a-octahydronaphthalene, 2-(p-t-butyl-phenyl)-1,4; 5,8-dimethano-1,2,3,4,4a,5,8,8a-octahydronaphthalene, 2-α-naphthyl-1,4; 5,8-dimethano-1,2,3,4,4a,5,8,8a-octahydronaphthalene, and 2-α-anthryl-1,4; 5,8-dimethano-1,2,3,4,4a,5,8,8a-octahydronaphthalene; aromatic norbornadiene derivatives such as 1,4-dihydro-1,4-methanonaphthalene, 1,4-dihydro-1,4-methano-6-methylnaphthalene, 1,4-dihydro-1,4-methano-6-methoxynaphthalene, 1,4-dihydro-1,4-methano-6-methoxycarbonyl naphthalene, 1,4-dihydro-6-fluoro-1,4-methanonaphthalene, 1,4-dihydro-1,4-methano-6-trifluoro-methyl naphthalene, 1,4-dihydro-1,4-methano-5,6,7,8-tetra-fluoronaphthalene, 6-chloro-1,4-dihydro-1,4-methanonaphthalene, 1,4-dihydro-1,4-methano-5,6,7,8-tetra-chloronaphthalene, 5,8-diacetoxy-1,4-dihydro-1,4-methanonaphthalene, 5,8-diacetoxy-6,7-dicyano-1,4-dihydro-1,4-methanonaphthalene, 5,8-diacetoxy-6,7-dichloro-1,4-dihydro-1,4-methanonaphthalene, 5,8-diacetoxy-1,4-dihydro-1,4-methano-6-methyl naphthalene, 5,8-diacetoxy-1,4-dihydro-6,7-dimethyl-1,4-methanonaphthalene, 5,8-diacetoxy-1,4-dihydro-6-fluoro-1,4-methanonaphthalene, 5,8-diacetoxy-1,4-dihydro-1,4-methano-6-methoxynaphthalene, 5,8-diacetoxy-1,4-dihydro-6,7-dimethoxy-1,4-methano naphthalene, 6-cyano-1,4-dihydro-1,4-methanonaphthalene, 1,4-dihydro-1,4-methanoanthracene, 1,4-dihydro-1,4-methano-5-methylanthracene, 1,4-dihydro-1,4-methano-6-methoxycarabonyl anthracene, 9,10-diacetoxy-1,4-dihydro-1,4-methanoanthracene, 6-cyano-1,4-dihydro-1,4-methanoanthracene, and 1,4-dihydro-9,10-diphenyl-1,4-methanoanthracene; ester type norbornadiene derivatives such as 2-methoxycarbonyl-bicyclo[2,2,1]-hepta-2,5-diene, 2-ethoxycarbonyl-bicyclo[2,2,1]-hepta-2,5-diene, 2-butyl-oxycarbonyl-bicyclo[2,2,1]-hepta-2,5-diene, 2-octyloxycarbonyl-bicyclo[2,2,1]-hepta-2,5-diene, 2-decyloxycarbonylbicyclo[2,2,1]-hepta-2,5-diene, 2-methoxycarbonylbicyclo[2,2,1]-hepta-2,5-diene, 2-methoxycarbonyl-3-ethylbicyclo[2,2,1]-hepta-2,5-diene, 2,3-dimethoxycarbonylbicyclo[2,2,1]-hepta-2,5-diene, 2,3-diethoxycarbonylbicyclo[2,2,1]-hepta-2,5-diene, 2,3-dibutyloxycarbonyl-bicyclo[2,2,1]-hetpa-2,5-diene, 2,3-dihexyloxycarbonylbicyclo[2,2,1]-hepta-2,5-diene, 2-acetoxymethyl-bicyclo[2,2,1]-hepta-2,5-diene, 2-butyryloxymethyl-bicyclo[2,2,1]-hepta-2,5-diene, 2-caproyloxy-bicyclo[2,2,1]-hepta-2,5-diene, 2,3-di(acetoxymethyl)-bicyclo[2,2,1]-hepta-2,5-diene, 2,3-di(butyryl-oxymethyl)-bicyclo[2,2,1]-hepta-2,5-diene, 2-methoxycarbonyl-methyl-bicyclo[2,2,1]-hepta-2,5-diene, 2-methoxycarbonyl-3-propyl-bicyclo[2,2,1]-hepta-2,5-diene, 2-methoxycarbonyl-3-hexyl-bicyclo[2,2,1]-hepta-2,5-diene, 2-methoxycarbonyl-3-phenyl-bicyclo[2,2,1]-hepta-2,5-diene, 2-acetoxymethyl-3-methyl-bicyclo[2,2,1]-hepta-2,5-diene, 2acetoxymethyl-3-ethyl-bicyclo[2,2,1]-hepta-2,5-diene, 2-acetoxymethyl-3-phenyl-bicyclo[2,2,1 ]-hepta-2,5-diene, and 2-valeryl-oxymethyl-3-phenyl-bicyclo[2,2,1]-hetpa-2,5-diene; bicyclo[2,2,1]-heptene-2(norbornene); 5-methyl-bicyclo[2,2,1]-heptene-2; 1,4; 5,8-dimethano-1,2,3,4,4a,5,8,8a-octahydronaphthalene; and methano-1,4-hexahydro-1,4,5,6,7,8-naphthalene.

It is preferred for the method of this invention to carry out the ring-opening copolymerization of a mixture of imide type norbornene derivatives and other cycloolefins with the latter used at the rate of 1.0 mol at most based on 1 mol of the former. Application of said other cycloolefins, for example, monocyclic olefins such as cyclopentene and cyclooctene in a larger proportion than 1.0 mol is not desired due to the resultant copolymer being reduced in tensile strength and surface hardness.

The object of this invention is attained by the ring-opening polymerization of imide type norborene derivatives or their mixtures with the above-mentioned other cycloolefins in the presence of a catalytic system comprising a mixture of organic aluminum compounds and compounds of tungsten and/or those of molybdenum, or other catalytic system formed of said catalytic system mixed with at least one compound selected from the group consisting of water, peroxides, epoxides, organic halides, acetal compounds, orthoformic acid esters, orthocarboxylic acid esters, alcoholic compounds and phenolic compounds with or without an inert organic solvent.

The ring-opening polymerization of, for example, the imide type norbornene derivatives whose chemical structures are expressed by the general formula (II)

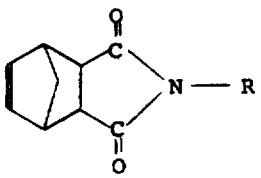

is effected by the following reaction formula:

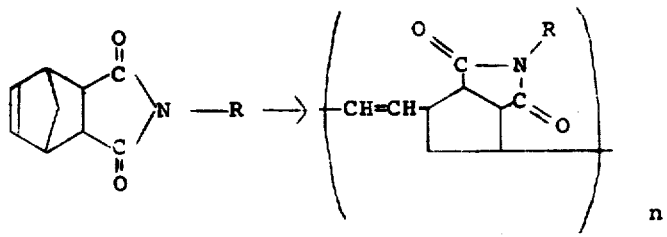

The polymer obtained presents different properties according to whether the double bond is of the cis or trans type or according to the steric positions of the substituents.

Imide type norbornene derivatives can be made into a polymer by the following vinylene type reaction formula:

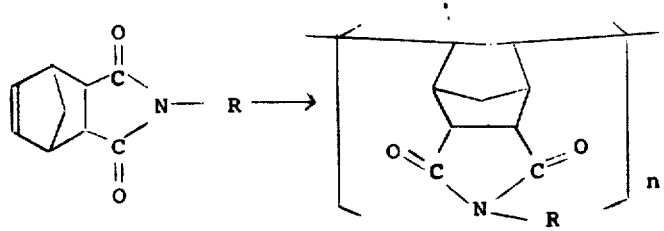

However, it is substantially impossible for the method of this invention to provide a vinylene type polymer.

Organic aluminum compounds constituting a part of the catalytic system used in the ring-opening polymerization are of the type whose chemical structure may be expressed by the general formula $AlR_3$ or $AlR_nX_{3-n}$ (where R represents the alkyl, aryl radical or aralkyl radical, X denotes halogens, hydrogen or alkoxy radical and $n$ is 1, 1.5 or 2) or $AlR_3$—$H_2O$ (where the mol ratio of $H_2O$ to $AlR_3$ has a value of <1.5).

The compounds represented by $AlR_3$, i.e., trialkyl aluminum include trimethyl aluminum, triethyl aluminum, tri-n-propyl aluminum, triisopropyl aluminum, triisobutyl aluminum, trihexyl aluminum and trioctyl aluminum, and triaryl aluminum such as tribenzyl aluminum and triphenyl aluminum.

Compounds denoted by $AlR_2X$ include dialkyl aluminum monohalides such as diethyl aluminum monochloride, di-n-propyl aluminum monochloride, di-isobutyl aluminum monochloride, di-n-butyl aluminum monochloride, diethyl aluminum monobromide, and diethyl aluminum monoiodide; dialkyl aluminum monohydrides such as diethyl aluminum monohydride, di-n-propyl aluminum monohydride, and di-isobutyl aluminum monohydride; diaryl aluminum monohalides such as dibenzyl aluminum monochloride, diphenyl aluminum monochloride, dibenzyl aluminum monobromide, and ditolyl aluminum monochloride; and dialkyl aluminum monoalkoxides such ad diethyl aluminum monoethoxide, and diisobutyl aluminum monobutoxide.

Compounds indicated by $AlR_{1.5}X_{1.5}$ include ethyl aluminum sesquichloride, ethyl aluminum sesquibromide, and isobutyl aluminum sesquichloride.

Compounds represented by $AlRX_2$ include alkyl aluminum dihalides such as ethyl aluminum dichloride, ethyl aluminum dibromide, propyl aluminum dichloride, isobutyl aluminum dichloride, ethyl aluminum dibromide, and ethyl aluminum diiodide; aryl aluminum dihalides such as benzyl aluminum dichloride, benzyl aluminum dibromide, tolyl aluminum dichloride, and phenyl aluminum dichloride; and alkyl aluminum dialkoxides such as ethyl aluminum diethoxide.

Mixtures denotoed by $AlR_3—H_2O$ are mixtures of trialkyl aluminum and water in which the trialkyl aluminum accounts for at least 2 mols based on 3 mols of water. Such mixtures include, for example, mixture of triethyl aluminum and water in which said triethyl aluminum and water should be in the ratio of 1:0.5.

Most preferable among the above-listed organic aluminum compounds are triethyl aluminum, triisobutyl aluminum, trihexyl aluminum, diethyl aluminum monochloride, di-n-butyl aluminum monobutoxide ethyl, aluminum sesquichloride, diethyl aluminum monobutoxide and a mixture of triethyl aluminum and water in which the triethyl aluminum and water bear the mole ratio of 1:0.5.

Compounds of tungsten and molybdenum partly constituting the catalytic system used in the method of this invention include halides of tungsten and molybdenum such as tungsten hexachloride, tungsten pentachloride, tungsten hexafluoride, tungsten pentafluoride, molybdenum pentachloride, molybdenum hexachloride, molybdenum pentafluoride, molybdenum hexafluoride, molybdenum pentabromochloride and molybdenum pentabromide; oxyhalides of tungsten and molybdenum such as tungsten oxytetrachloride, tungsten oxytetrabromide, tungsten oxydichloride, molybdenum oxytrichloride, and molybdenum oxytetrachloride, in addition, molybdenum dioxydiacetyl acetonate $[MoO_2(CH_3COCH=C(CH_3)O—)_2$, hereinafter referred to as $MoO_2(AcAc)_2]$, tungsten hexaalcoholate, tungsten hexaphenolate, tetrachlorotungsten diphenolate, tetrachlorotungsten dialcoholate, dichloromolybdenum dialcoholate, and dichloromolybdenum triphenolate; and halides of aluminium-tungsten, for example, $Al_4W_3Cl_{18}$ obtained by reducing halides of tungsten by powders of aluminium. Most preferable among the above-listed compounds of tungsten and molybdenum are molybdenum pentachloride, tungsten hexachloride, tungsten oxytetrachloride ($WOCl_4$) and $Al_4W_3Cl_{18}$. The mole ratio of organic aluminium compounds to the compounds of tungsten or molybdenum is generally more than 0.1, preferably more than 0.5. Use of less than 0.1 mol or organic aluminium compounds based on 1 mol of compounds of tungsten or molybdenum failed to attain practical polymerization activity. A catalytic system consisting of 10 mols of organic aluminium compounds based on 1 mol of compounds of tungsten or molybdenum realized an extremely high degree of polymerization activity.

While, in the ring-opening polymerization, the above-mentioned binary catalytic system comprising organic aluminium compounds and compounds of tungsten or molybdenum can effect the ring-opening polymerization of acid anhydride type norbornene derivatives, addition of a third component to said binary catalytic system to convert it into a ternary system prominently promotes the polymerization activity and further varies the properties of the polymers obtained using said binary catalytic system.

Said third component may be formed of at least one compound selected from the group consisting of water, peroxides, epoxides, organic halides, acetal compounds, alcoholic compounds, phenolic compounds, orthoformic acid esters, and orthocarboxylic acid esters. The peroxides include alkyl peroxides such as t-butyl peroxide; aryl peroxides such as benzoyl peroxide; alkyl or aralkyl hydroperoxides such as t-butyl hydroperoxide and cumene hydroperoxide; hydrogen peroxide, peracids such as peracetic acid; and esters, ketones and aldehydes derived from said peracids. The epoxides include ethylene oxide, propylene oxide, butene oxide, epichlorohydrin, allyl glycidyl ether, and butadiene monoxide. The organic halides include t-butyl hypohalite compounds; allyl halides such as allyl chloride; t-alkyl halides such as t-butyl chloride; halogenated ketones such as α-chloroacetone; and halogenated alcohols such as 2-chloroethanol. The acetal compounds include acetaldehyde dimethylacetal, acetaldehyde diethylacetal, diethoxy methane, acetone dimethyl acetal, and dichloroacetaldehyde dimethyl acetal. The alcoholic compounds include methyl alcohol, ethyl alcohol, n-propyl alcohol, n-butyl alcohol, isobutyl alcohol and ethylene chlorohydrin.

The phenolic compounds include phenol, p-methyl phenol, P,P'-isopropylidene diphenol, 2,6-dimethylphenol, p-chlorophenol, 1,3-benzenediol and 1,3,5-benzenetriol. The orthoformic acid esters include methyl orthoformate and ethyl orthoformate. The orthocarboxylic acid esters include ethyl orthoacetate, n-propyl orthopropionate and butyl orthophenylacetate. Preferable among the orthoformic acid esters and orthocarboxylic acid esters are alkyl orthoformate such as methyl orthoformate and ethyl orthoformate. Water is also an effective third component of the subject catalytic system. While the amount of the third component added varies with its type, its proportion is generally 0.1 to 6 mols, or preferably 0.3 to 3 mols based on 1 mol of compounds of tungsten or molybdenum.

While the amount of the subject catalytic system added to the monomer of imide type norbornene derivatives varies with the type of said monomer, etc. the compounds of tungsten or molybdenum should generally be added at the rate of 0.001 to 20 mols, or preferably 0.05 to 5 mols based on 100 mols of said monomer. Addition of more than 20 mols of the compounds of tungsten or molybdenum based on 100 mols of said monomer not only results in high cost but also fails to promote the catalytic action, namely, such excess addition does not elevate the polymerization activity. Further, if unduly large amounts of said compounds of tungsten or molybdenum are used, the reaction system will contain such amounts of residual tungsten or molybdenum compounds as will be difficult to eliminate after completion of the ring-opening polymerization. The presence of said catalytic component in the polymer obtained will undesirably color the polymer. Said coloration increases the tint of the polymer in the subsequent operation of molding the polymer or causes the thermal deterioration of the resultant product.

As previously mentioned, the ring-opening polymerization of imide type norbornene derivatives can be carried out using the previously described catalytic system with or without an inert organic solvent. Said inert organic solvent is preferred to be the type which does not harmfully affect the catalytic system. Typical of said solvents are aliphatic hydrocarbons such as pentane, heptane, hexane, petroleum ether and decane; aromatic hydrocarbons such as benzene, toluene and xylene; alicyclic hydrocarbons such as cyclohexane, decaline and cyclooctane; halogenated hydrocarbons such as methylene chloride; 1-2-dichroloethane, 1,1-dichloroethane, 1,2-dichloropropane, chloroform, chlorobenzene; and ethers such as diethyl ether and tetrahydrofuran. The above-listed inert organic solvents may be used along or in combination.

The catalytic components, monomer (imide type norbornene derivatives) and inert organic solvent (if used) may be added in various sequential orders. The typical sequence is to add first the inert organic solvent, secondly the monomer, thirdly the compounds of tungsten or molybdenum, fourthly the third component (if used), and finally organic aluminum compounds. It is also possible to mix the desired compounds among the catalytic components, monomer and solvent or heat them separately before they are used in the ring-opening polymerization.

The object of the ring-opening polymerization can be fully attained, as previously described, by the ring-opening polymerization of imide type norbornene derivatives in the presence of a catalytic system comprising compounds of tungsten and/or those of molybdenum and organic aluminum compounds or a mixture of said both types of compounds and the aforesaid third component. Yet, the molecular weight of the resultant polymer can be controlled by adding to the polymerization system α-olefins such as ethylene, propylene, butene-1 and hexene-1; internal olefins such as butene-2 and hexene-2; conjugated diolefins such as butadiene and isoprene; or nonconjugated diolefins such as 1,4-hexadiene. In this case, it is generally recommended to add 0.01 to 10 parts by weight of said molecular weight controlling agent based on 100 parts by weight of the monomer of norbornene derivatives.

As previously mentioned, the polymer can be obtained by the ring-opening polymerization of the subject monomer in the presence of an inert organic solvent or in the absence of said solvent (bulk polymerization). If used, said inert organic solvent is generally preferred to be added at the ratio of 1 to 10 parts by volume based on 1 part volume of the monomer.

The ring-opening polymerization is carried out generally at a temperature ranging from −100° to +200°C or preferably −40° to +100°C. At a lower temperature than −100°C, the reaction system does not display desirable polymerization activity with the resultant extremely slow progress of polymerization. In such case, progress of the polymerization consumes a great deal of time, furthermore, sometimes causing a mixture of the inert organic solvent and monomer to be solidified. Conversely, a higher temperature than 200°C fails to provide a good quality of polymer prepared by ring-opening polymerization, and is practically undesirable.

The ring-opening polymerization is preferred to take place in an inert atmosphere such as, argon and nitrogen. If oxygen and moisture are present in the reaction system, then the catalytic components i.e., the organic aluminum compounds and the compounds of tungsten or molybdenum will be changed to obstruct the reproducibility of said polymerization.

Elimination of a catalyst residue and recovery of a polymer produced upon completion of the ring-opening polymerization should be effected by the customary process of said elimination and recovery applied in the solution polymerization of, for example, isoprene and butadiene. When a solution obtained by polymerization (a solution containing a polymer resulting from ring-opening polymerization, unreacted monomers and a catalyst) is poured in lower alcohol such as methyl alcohol and ethyl alcohol containing a small amount of hydrochloric acid, then the catalyst is removed and a polymer produced is precipitated. It is also effective for purification to pretreat the reaction system by a treating agent such as ethanol amine, methoxyethyl alcohol, acetyl acetone and ethyl acetoacetate.

The object of the elimination of the catalyst residue and the recovery of the polymer can be further achieved by first uniformly diluting the solution resulting from the ring-opening polymerization using solvent immiscible with water, for example, methylene chloride, then by treating said solution with water containing a chelating agent such as nitrilotriacetic acid or ethylene diamine tetraacetic acid to eliminate the catalyst residue and afterwards by recovering the polymer and the organic solvent by the steam stripping process.

The ring-opening polymerization product of imide type norbornene derivatives obtained by the above-mentioned process is a colorless or faintly yellow transparent polymer. This polymer displays widely varying properties depending on the kind of monomers or imide type norbornene derivatives. Said properties range from those of resinous materials having a high glass transition point to those of soft rubbery materials.

Table 1 below sets forth the Izod impact strength, tensile strength and elongation of the ring-opening polymerization product of N-methyl-3,6-methylene-1,2,3,6-tetrahydro-cis-phthalimide (obtained in Example 17) and N-n-butyl-3,6-methylene-1,2,3,6-tetrahydro-cis-phthalimide (obtained in Example 34) in comparison with those of polyvinyl chloride (hereinafter referred to as "PVC") and polypropylene (hereinafter referred to as "PP") generally manufactured on an industrial scale. As seen from Table 1, both ring-opening polymerization products of said two types of norbornene derivatives have higher impact strength than, and well comparable tensile strength with, PVC and PP, though smaller elongation than the latter.

Table 1

| Polymer | Izod impact[1] strength (kg.cm/cm-notched) | Tensile strength[2] (kg/cm$^2$) | Elongation[2] (%) |
|---|---|---|---|
| A[3] | 18.45 | 506 | 5.9 |
| B[4] | 20.61 | 468 | 200 |
| PP[5] | 1.66 | 356 | 950 |
| PVC[6] | 3.18 | 539 | 240 |

[1]Measured by the method of ASTM D-256-56
[2]Measured by the method of ASTM D-638-58T
[3]Ring-opening polymerization product obtained in Example 17, namely polymer (exo type) of N-methyl-3, 6-methylene-1,2,3,6-tetrahydro-cis-phthalimide.
[4]Ring-opening polymerization product obtained in Example 34, namely polymer (exo type) of N-n-butyl-3, 6-methylene-1,2,3,6-tetrahydro-cis-phthalimide
[5]Polypropylene manufactured by Showa Yuka Co., Ltd. under a trade name "Shoallomer"
[6]Polyvinyl chloride manufactured by Kureha Chemical Industry Co., Ltd. under a trade name "Kureha S 901"

The polymer obtained by this invention whose molecules bear reactive double bonds not only other monomers such as styrene, acrylonitrile and methyl methacrylate to be graft-copolymerized with said polymer, but also can be formed into a thermosetting resin by applying heat in the presence or absence of a cross-linking agent such as an organic peroxide in said polymer. Further, the polymer of this invention which has a nature to decompose itself upon exposure to sunlight can be used as the so-called photodegradation type.

While the polymer or copolymer prepared from imide type norbornene derivatives in this invention may be used alone, it can be applied in a form blended with synthetic resins such as polyvinyl chloride, acrylonitrile-butadiene-styrene resin (ABS resin) and methyl methacrylate resin. Further depending on the applications, the polymer of this invention may be mixed with additives such as stabilizers against light (ultraviolet rays), heat, oxygen and ozone, flame retardants, plasticizers, reinforcing agents, fillers, coloring agents, antistatic agents and decomposition accelerators to display a more prominent effect.

The polymer or copolymer obtained by this invention, whether alone, or in a form mixed with the above-listed resins or additives, can be molded into a variety of shaped articles by the compression molding, extrusion molding, injection molding, blow molding and casting which are generally applied in manufacturing resin products.

The polymer obtained by this invention can be used in wide fields by being molded into various forms with its aforesaid advantages drown upon. For example, the polymer may be fabricated into vessels like bottles, films and secondary processed goods thereof such as bags, packing materials, daily sundry goods and parts of machines and electric appliances including illumination apparatuses. Further, the present polymer decomposes itself when exposed to sunlight (ultraviolet rays). Accordingly, if the film or vessel prepared from said polymer which contains goods or foods is exposed to sunlight for a certain length of time after being emptied of its contents, then it will be easily disposed of a rubbish. Unlike general resins, for example, PP or PVC, therefore, the polymer obtained by this invention has the advantage of eliminating any troublesome dumping work such as burning after moldings of said general resins, for example, films or vessels have fulfilled application.

Further, the ring-opening polymerization product of imide type norbornene derivatives obtained by the method of this invention has prominent adhesivity to, for example, other plastics, metals, cellulosic materials such as wood, paper and fibers, and glass. Therefore, this polymer prepared by ring-opening polymerization of imide type norbornene derivatives can be used as an adhesive agent in the form of powder, film or solution and also as a coating agent on the surface of moldings of the above-listed materials by being deposited in the form of powder, film, sheet or solution.

This invention will be more fully understood by reference to the exmples which follow. Throughout the examples, the reduced viscosity ($\eta_{sp}/C$) of the polymer was measured at 30°C in dimethyl formamide with the concentration of the polymer fixed at 0.1 g/dl.

EXAMPLE 1

A dried flask purged with nitrogen was filled with 100 parts by weight of N-methyl-3,6-methylene-1,2,3,6-tetrahydro-cis-phthalimide (exo type) as a monomer, 300 parts by weight of 1,2-dichloroethane, and tungsten hexachloride (used in 1 mol% based on the monomer). After the monomer was dissolved, diethyl aluminum chloride was added in 6 mol% based on the monomer at room temperature. Ring-opening polymerization was carried out 24 hours with the mass maintained at 50°C. The reaction system was in the form of viscous solution at the completion of the polymerization. After the reaction system was allowed to cool to room temperature, 0.5% by weight of bis(2-hydroxy-3-t-butyl-5-methyl phenyl) methane based on the monomer was added as a stabilizer. The resultant reaction solution was poured in 2000 parts by weight of methyl alcohol containing 5% by volume of concentrated hydrochloric acid. A precipitated polymer was filtered out and fully washed with methyl alcohol. Further, 0.5% by weight of the above-mentioned stabilizer was added based on the polymer. The mass was vacuum dried at 50°C overnight, providing a yellowish brown polymer with a conversion of 52.4%. The polymer obtained was dissolved in 1,2-dichloroethane having an about ten times larger amount than the polymer, and purified by reverse precipitation using a precipitant of methyl alcohol containing 5% by volume of hydrochloric acid and 0.5% by weight of the above-mentioned stabilizer. When thus purified twice, the polymer became transparent with a slightly yellow color and indicated a reduced viscosity $\eta_{sp}/C$ of 0.38.

EXAMPLE 2

Ring-opening polymerization was effected in substantially the same manner as in Example 1, excepting that the tungsten hexachloride used as a catalyst in Example 1 was replaced by 1 mol% of molybdenum pentachloride based on the amount of the monomer. Upon completion of the ring-opening polymerization, the same aftertreatment was carried out as in Example 1, providing a yellow transparent polymer having a reduced viscosity of 0.25 with the conversion of 30.2%.

EXAMPLE 3

Ring-opening polymerization was carried out in substantially the same manner as in Example 1, excepting that the tungsten hexachloride used as a catalyst in Example 1 was replaced by 1 mol% of tungsten hexaphenolate [W(OC$_6$H$_5$)$_6$] based on the amount of the monomer. Upon completion of the polymerization reaction, the same aftertreatment was applied as in Example 1, providing a slightly yellow transparent polymer having a reduced viscosity of 0.36 with the conversion of 41.3%.

EXAMPLE 4 Ring-opening polymerization was conducted in substantially the same manner as in Example 1, excepting that the tungsten hexachloride used as a catalyst in Example 1 was replaced by 1 mol% of molybdenum dioxy diacetyl acetonate [MoO$_2$(AcAc)$_2$]. Upon completion of the polymerization reaction, the same aftertreatment was carried out as in Example 1, providing a slightly yellow transparent polymer having a reduced viscosity of 0.41 with the conversion of 39.5%.

EXAMPLE 5

Ring-opening polymerization was carried out in substantially the same manner as in Example 1, excepting that the tungsten hexachloride used as a catalyst in Example 1 was replaced by 1 mol% of $Al_4W_3Cl_{18}$ obtained by reducing tungsten hexachloride by power of aluminum based on the amount of the monomer. Upon completion of the reaction, the same aftertreatment was effected as in Example 1, providing a slightly yellow transparent polymer having a reduced viscosity of 0.19 with the conversion of 30.6%.

EXAMPLE 6

Ring-opening polymerization was effected in substantially the same manner as in Example 1, excepting that the diethyl aluminum chloride used as a catalyst in Example 1 was replaced by 6 mol% of triethyl aluminum based on the amount of the monomer. Upon completion of the polymerization reaction, the same aftertreatment was carried out as in Example 1, providing a slightly yellow polymer having a reduced viscosity of 0.34 with the conversion of 35.1%.

EXAMPLE 7

Ring-opening polymerization was carried out in substantially the same manner as in Example 1, excepting that diethyl aluminum chloride uused as a catalyst in Example 1 was replaced by 6 mol% of a catalyst based on the amounts of the monomer which was prepared by denaturating 1.0 mol of triethyl aluminum by 0.5 mol of water. Upon completion of the reaction, the same aftertreatment was applied as in Example 1, providing a slightly yellow transparent polymer having a reduced viscosity of 0.29 with the conversion of 40.9%.

EXAMPLE 8

Ring-opening polymerization was conducted in substantially the same manner as in Example 1, excepting that the diethyl aluminum chloride used as a catalyst in Example 1 was replaced by 6 mol% of diethyl aluminum hydride. Upon completion of the reaction, the same aftertreatment was carried out as in Example 1 providing a slightly yellow transparent polymer having a reduced viscosity of 0.23 with the conversion of 32.9%.

EXAMPLE 9

Ring-opening polymerization was undertaken in substantially the same manner as in Example 1, excepting that diethyl aluminum chloride used as a catalyst in Example 1 was replaced by 6 mol% of a catalyst prepared by denaturating 1 mol of triethyl aluminum by 1 mol of n-butyl alcohol. Upon completion of the reaction, the same aftertreatment was conducted as in Example 1, providing a slightly yellow transparent polymer having a reduced viscosity of 0.41 with the conversion of 38.5%.

EXAMPLE 10

Ring-opening polymerization was effected in substantially the same manner as in Example 1, excepting that diethyl aluminum chloride used as a catalyst in Example 1 was replaced by ethyl aluminum dichloride. Upon completion of the reaction, the same aftertreatment was carried out as in Example 1, providing a slightly yellow transparent polymer having a reduced viscosity of 0.37 with the conversion of 36.1%.

EXAMPLE 11

Ring-opening polymerization was undertaken in substantially the same manner as in Example 1, excepting that diethyl aluminum chloride used as a catalyst in Example 1 was replaced by ethyl aluminum sesquichloride. Upon completion of the reaction, the same aftertreatment was carried out as in Example 1, providing a slightly yellow transparet polymer having a reduced viscosity of 0.30 with the conversion of 30.8%.

EXAMPLE 12

Ring-opening polymerization was undertaken in substantially the same manner as in Example 1, excepting that the N-methyl-3,6-methylene-1,2,3,6-tetrahydro-cis-phthalimide used as a monomer in Example 1 was replaced by 100 parts by weight of N-phenyl-3,6-methylene-1,2,3,6-tetrahydro-cis-phthalimide. Upon completion of the reaction, the same aftertreatment was applied as in Example 1, providing a slightly yellow transparent polymer having a reduced viscosity of 0.32 with the conversion of 46.1%.

EXAMPLE 13

Ring-opening polymerization was effected substantially in the same manner as in Example 12, excepting that the catalyst of diethyl aluminum chloride used in Example 12 was replaced by 6 mol% of triethyl aluminum based on the monomer. Upon completion of the polymerization, the same aftertreatment was carried out as in Example 12, providing a slightly yellow transparent polymer with a conversion of 29.0% and a reduced viscosity of 0.32.

EXAMPLE 14

Ring-opening polymerization was conducted substantially in the same manner as in Example 12, excepting that the catalyst of diethyl aluminum chloride used in Example 12 was replaced by 6 mol% (based on the monomer) of a compound obtained by denaturating triethyl aluminum by addition of 0.5 mol of water based on 1.0 mol of the triethyl aluminum. Upon completion of the polymerization, the same aftertreatment was carried out as in Example 12, providing a slightly yellow transparent polymer with a conversion of 35.5% and a reduced viscosity of 0.25.

EXAMPLE 15

Ring-opening polymerization was carried out substantially in the same manner as in Example 12, excepting that the catalyst of diethyl aluminum chloride used in Example 12 was replaced by 6 mol% of a compound obtained by denaturating triethyl aluminum by addition of 1 mol of n-butyl alcohol based on 1 mol of the triethyl aluminum. Upon completion of the polymerization, the same aftertreatment was effected as in Example 12, providing a slightly yellow transparent polymer with a conversion of 36.2% and a reduced viscosity of 0.33.

EXAMPLE 16

Ring-opening polymerization was effected substantially in the same manner as in Example 12, excepting that the catalyst of tungsten hexachloride was replaced by 1 mol% of molybdenum pentachloride based on the monomer. Upon completion of the polymerization, the same aftertreatment was carried out, providing a slightly yellow transparent polymer with a conversion of 25.3% and a reduced viscosity of 0.26.

EXAMPLE 17

Ring-opening polymerization was conducted substantially in the same manner as in Example 1, excepting that the proportions of tungsten hexachloride and diethyl aluminum chloride jointly constituting the catalyst used in Example 1 were changed to 0.5 and 3 mol% respectively based on the monomer and that 3 mol of acetaldehyde diethyl acetal based on 1 mol of the tungsten hexachloride was further added as a third catalytic component. Upon completion of the polymerization, the same aftertreatment was effected in the same manner as in Example 1, providing slightly yellow polymer, with a conversion of 98.2% and a reduced viscosity of 0.98. The polymer indicated a glass transition temperature of 189°C as measured by differential scanning colorimetry and also such Izod impact strength, tensile strength and elongation as shown in Table 1.

EXAMPLE 18

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-methyl-3,6-methylene-1,2,3,6-tetrahydro-cis-phthalimide (endo type).

Upon completion of the reaction, the same aftertreatment was effected as in Example 17, providing a slightly yellow transparent polymer having a reduced viscosity of 0.23 with the conversion of 25.7%.

EXAMPLE 19

Ring-opening polymerization was carried out in substantially the same manner as in Example 17, excepting that the N-methyl-3,6-methylene-1,2,3,6-tetrahydro-cis-phthalimide (exo type) used as a monomer in Example 17 was replaced by N-phenyl-3,6-methylene-1,2,3,6-tetrahydro-cis-phthalimide (exo type). Upon completion of the reaction, the same aftertreatment was applied as in Example 17, providing a slightly yellow transparent polymer having a reduced viscosity of 0.82 with the conversion of 97.0%. This polymer was dissolved in dimethyl formamide, dimethyl-sulfoxide, N-methyl pyrrolidone, methylene chloride, 1,2-dichloroethane, chloroform, cyclohexanone, dioxane and pyridine. However, the polymer was insoluble in hydrocarbons such as n-hexane, cyclohexane, toluene and xylene. The polymer has a glass transition point of 166°C (measured in the same manner as in Example 17).

EXAMPLE 20

Ring-opening polymerization was conducted in substantially the same manner as in Example 19, excepting that the N-phenyl-3,6-methylene-1,2,3,6-tetrahydro-cis-phthalimide (exo type) used as a monomer in Example 19 was replaced by N-phenyl-3,6-methylene-1,2,3,6-tetrahydro-cis-phthalimide (the ratio of the exo isomer to the endo isomer is 1:1). Upon completion of the reaction, the same aftertreatment was effected as in Example 19, providing a slightly yellow transparent polymer having a reduced viscosity of 0.41 with the conversion of 70.0%.

EXAMPLE 21

Ring-opening polymerization was undertaken in substantially the same manner as in Example 19, excepting that the N-phenyl-3,6-methylene-1,2,3,6-tetrahydro-cis-phthalimide (exo type) used as a monomer in Example 19 was replaced by N-phenyl-3,6-methylene-1,2,3,6-tetrahydro-cis-phthalimide. Upon completion of the reaction, the same aftertreatment was applied as in Example 19, providing a slightly yellow polymer having a reduced viscosity of 0.33 with the conversion of 28.0%.

EXAMPLE 22

Ring-opening polymerization was undertaken in substantially the same manner as in Example 17, excepting that the acetaldehyde diethyl acetal used as a third component in Example 17 was replaced by 3 mols of benzoyl peroxide based on 1 mol of the tungsten hexachloride. Upon completion of the reaction, the same aftertreatment was effected as in Example 17, providing a slightly yellow transparent polymer having a reduced viscosity of 0.82 with the conversion of 72.6%.

EXAMPLE 23

Ring-opening polymerization was carried out in substantially the same manner as in Example 17, excepting that the acetaldehyde diethyl acetal used as a third component in Example 17 was replaced by 3 mols of t-butyl peroxide based on 1 mol of the tungsten hexachloride. Upon completion of the reaction, the same aftertreatment was carried out as in Example 17, providing a slightly yellow transparent polymer having a reduced viscosity of 0.65 with the conversion of 88.1%.

EXAMPLE 24

Ring-opening polymerization was effected in substantially the same manner as in Example 17, excepting that the acetaldehyde diethyl acetal used as a third component in Example 17 was replaced by 3 mols of ethyl alcohol based on 1 mol of the tungsten hexachloride. Upon completion of the reaction, the same aftertreatment was applied as in Example 17, providing a slightly yellow transparent polymer having a reduced viscosity of 0.78 with the conversion of 91.8%.

EXAMPLE 25

Ring-opening polymerization was undertaken in substantially the same manner as in Example 17, excepting that the acetaldehyde diethyl acetal used as a third component in Example 17 was replaced by 3 mols of n-butyl alcohol based on 1 mole of the tungsten hexachloride. Upon completion of the reaction, the same aftertreatment was carried out as in Example 17, providing a slightly yellow transparent polymer having a reduced viscosity of 0.66 with the conversion of 94.5%.

EXAMPLE 26

Ring-opening polymerization was conducted in substantially the same manner as in Example 17, excepting that the acetaldehyde diethyl acetal used as a third component in Example 17 was replaced by 3 mols of propylene oxide based on 1 mol of the tungsten hexachloride. Upon completion of the reaction, the same aftertreatment was applied as in Example 17, providing a slightly yellow transparent polymer having a reduced viscosity of 0.74 with the conversion of 87.4%.

EXAMPLE 27

Ring-opening polymerization was conducted in substantially the same manner as in Example 17, excepting that the acetaldehyde diethyl acetal used as a third component in Example 17 was replaced by 3 mols of ethylene chlorohydrin based on 1 mol of the tungsten hexachloride. Upon completion of the reaction, the same aftertreatment as in Example 17 was carried out, providing a slightly yellow transparent polymer having a reduced viscosity of 0.59 with the conversion of 91.4%.

EXAMPLE 28

Ring-opening polymerization was undertaken in substantially the same manner as in Example 17, excepting that the acetaldehyde diethyl acetal used as a third component in Example 17 was replaced by 3 mols of t-butyl chloride based on 1 mol of the tungsten hexachloride. Upon completion of the reaction, the same aftertreatment was applied as in Example 17, providing a slightly yellow transparent polymer having a reduced viscosity of 0.61 with the conversion of 83.7%.

EXAMPLE 29

Ring-opening polymerization was conducted in substantially the same manner as in Example 17, excepting that the acetaldehyde diethyl acetal used as a third component in Example 17 was replaced by 3 mols of ethyl orthoformate based on 1 mol of the tungsten hexachloride. Upon completion of the reaction, the same aftertreatment was applied as in Example 17, providing a slightly yellow transparent polymer having a reduced viscosity of 0.78 with the conversion of 68.3%.

EXAMPLE 30

Ring-opening polymerization was effected in substantially the same manner as in Example 17, excepting that the acetaldehyde diethyl acetal used as a third component in Example 17 was replaced by 3 mols of α-chloroacetone based on 1 mol of the tungsten hexachloride. Upon completion of the reaction, the same aftertreatment was applied as in Example 17, providing a slightly yellow transparent polymer having a reduced viscosity of 0.64 with the conversion of 72.1%.

EXAMPLE 31

Ring-opening polymerization was effected in substantially the same manner as in Example 17, excepting that the acetaldehyde diethyl acetal used as a third component in Example 17 was replaced by 1 mol of water based on the tungsten hexachloride. Upon completion of the reaction, the same aftertreatment was applied as in Example 17, providing a slightly yellow transparent polymer having a reduced viscosity of 0.62 with the conversion of 60.8%.

EXAMPLE 32

Ring-opening polymerization was undertaken in substantially the same manner as in Example 17, excepting that 1 mol % of n-hexene-1 was added as a molecular weight controlling agent to the N-methyl-3,6-methylene-1,2,3,6-tetrahydro-cis-phthalimide (exo type) used as a monomer in Example 17. Upon completion of the reaction, the same aftertreatment was effected as in Example 17, providing a slightly yellow transparent polymer having a reduced viscosity of 0.29 with the conversion of 88.1%.

EXAMPLE 33

Ring-opening polymerization was conducted in substantially the same manner as in Example 17, excepting that 1 mol % of butadiene was added as a molecular weight controlling agent to the N-methyl-3,6-methylene-1,2,3,6-tetrahydro-cis-phthalimide (exo type). Upon completion of the reaction, the same aftertreatment was applied as in Example 17, providing a slightly yellow transparent polymer having a reduced viscosity of 0.32 with the conversion of 85.3%.

EXAMPLE 34

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-n-butyl-3,6-methylene-1,2,3,6-tetrahydro-cis-phthalimide (exo type).

Upon completion of the reaction, the same aftertreatment was effected as in Example 17, providing a slightly yellow transparent polymer having a reduced viscosity of 0.71 with the conversion of 88.6%. An Izod impact strength, tensile strength and elongation of said polymer are shown in Table 1.

EXAMPLE 35

Ring-opening polymerization was carried out in substantially the same manner as in Example 17, excepting that the N-methyl-3,6-methylene-1,2,3,6-tetrahydro-cis-phthalimide (exo type) used as a monomer in Example 17 was replaced by N-n-octyl-3,6-methylene-1,2,3,6-tetrahydro-cis-phthalimide (exo type). Upon completion of the reaction, the same aftertreatment was applied as in Example 17, providing a slightly yellow transparent elastomer (rubber-like material) having a reduced viscosity of 0.57 with the conversion of 92.5%.

EXAMPLE 36

Ring-opening polymerization was conducted in substantially the same manner as in Example 17, excepting that the N-methyl-3,6-methylene-1,2,3,6-tetrahydro-cis-phthalimide (exo type) used as a monomer in Example 17 was replaced by N-cyclohexyl-3,6-methylene-1,2,3,6-tetrahydro-cis-phthalimide (exo type). Upon completion of the reaction, the same aftertreatment was effected as in Example 17, providing a slightly yellow transparent polymer having a reduced viscosity of 0.57 with the conversion of 94.6%.

EXAMPLE 37

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-methoxycarbonyl-methyl- 3,6-methylene-1,2,3,6-tetrahydro-cis-phthalimide (exo type). Upon completion of the reaction, the same aftertreatment was applied as in Example 17, providing a slightly yellow transparent polymer having a reduced viscosity of 0.60 with the conversion of 74.1%.

EXAMPLE 38

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-methyl-3,6-methylene-1-methyl-1,2,3,6-tetrahydro-cis-phthalimide (exo type).

Upon completion of the reaction, the same aftertreatment was effected as in Example 17, providing a slightly yellow transparent polymer having a reduced viscosity of 0.73 with the conversion of 86.1%.

EXAMPLE 39

Ring-opening polymerization was carried out in substantially the same manner as in Example 17, excepting that the N-methyl-3,6-methylene-1,2,3,6-tetrahydro-cis-phthalimide (exo type) used as a monomer in Example 17 was replaced by N-methyl-bicyclo [2,2,1]-hepta-2-ene-5-spiro-3′-succinimide (exo type). Upon completion of the reaction, the same aftertreatment was applied as in Example 17, providing a slightly yellow transparent polymer having a reduced viscosity of 0.79 with the conversion of 90.6%.

EXAMPLE 40

Ring-opening polymerization was conducted in substantially the same manner as in Example 17, excepting that the N-methyl-3,6-methylene-1,2,3,6-tetrahydro-cis-phthalimide (exo type) used as a monomer in Example 17 was replaced by N-methyl-2-aza-1,3-dioxo-5,8-methano-1,2,3,4,4a,5,8,8a-octahydronaphthalene (exo type). Upon completion of the reaction, the same aftertreatment was effected as in Example 17, providing a slightly yellow transparent polymer having a reduced viscosity of 0.64 with the conversion of 69.4%.

EXAMPLE 41

Ring-opening polymerization was undertaken in substantially the same manner as in Example 17, excepting that the N-methyl-3,6-methylene-1,2,3,6-tetrahydro-cis-phtalimide (exo type) used as a monomer in Example 17 was replaced by N-methyl-5,8-methano-1,2,3,4,4a,5,8,8a-octahydronaphthalene-2,3-dicarboxyimide (exo type). Upon completion of the reaction, the same aftertreatment was applied as in Example 17, providing a slightly yellow transparent polymer having a reduced viscosity of 0.60 with the conversion of 64.4%.

EXAMPLE 42

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-methyl-5,8-methano-2-methyl-1,2,3,4,4a,5,8,8a-octahydronaphthalene-2,3-dicarboxyimide (exo type).

Upon completion of the reaction, the same aftertreatment was effected as in Example 17, providing a slightly yellow transparent polymer having a reduced viscosity of 0.69 with the conversion of 65.0%.

EXAMPLE 43

Ring-opening polymerization was carried out in substantially the same manner as in Example 17, excepting that the N-methyl-3,6-methylene-1,2,3,6-tetrahydro-cis-phthalimide (exo type) used as a monomer in Example 17 was replaced by N-methyl-1,4-methano-1,4,4a,5,6,7,8,8a-octahydronaphthalene-6-spiro-3′-succinimide (exo type). Upon completion of the reaction, the same aftertreatment was applied as in Example 17, provided a slightly yellow transparent polymer having a reduced viscosity of 0.62 with the conversion of 60.8%.

EXAMPLE 44

Ring-opening polymerization was conducted in substantially the same manner as in Example 17, excepting that the N-methyl-3,6-methylene-1,2,3,6-tetrahydro-cis-phthalimide (exo type) used as a monomer in Example 17 was replaced by N-methyl-1,4,5,8-dimethano-1,2,3,4,4a,5,8,8a-octahydronaphthalene-2,3-dicarboxyimide (exo type). Upon completion of the reaction, the same aftertreatment was effected as in Example 17, providing a slightly yellow transparent polymer having a reduced viscosity of 0.54 with the conversion of 61.3%.

EXAMPLE 45

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-methyl-2-aza-1,3-dioxo-5,8-methano-1,2,3,4,4a,5,8,8a,9, 9a,10,10a-dodecahydroanthracene (exo type). Upon completion of the reaction, the same aftertreatment was applied as in Example 17, providing a slightly yellow transparent polymer having a reduced viscosity of 0.60 with the conversion of 58.1%.

EXAMPLE 46

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-methyl-1,4,5,8-dimethano-2-methyl-1,2,3,4,4a,5,8,8A-octahydronaphthalene-2,3-dicarboxyimide (exo type).

Upon completion of the reaction, the same aftertreatment was effected as in Example 17, providing a slightly yellow transparent polymer having a reduced viscosity of 0.56 with the conversion of 62.8%.

EXAMPLE 47

Ring-opening polymerization was carried out in substantially the same manner as in Example 17, excepting that the N-methyl-3,6-methylene-1,2,3,6-tetrahydro-cis-phthalimide (exo type) used as a monomer in Example 17 was replaced by N-methyl-1,4,5,8-dimethano-1,4,4a,5,6,7,8,8a-octahydronaphthalene-6-spiro-3′succinimide (exo type). Upon completion of the reaction, the same aftertreatment was applied as in Example 17, providing a slightly yellow transparent polymer having a reduced viscosity of 0.61 with the conversion of 57.2%.

EXAMPLE 48

Ring-opening polymerization was conducted in substantially the same manner as in Example 17, excepting that the N-methyl-3,6-methylene-1,2,3,6-tetrahydro-cis-phthalimide (exo type) used as a monomer in Example 17 was replaced by N-methyl-2-aza-5,8,9,10-dimethano-1,3-1,2,3,4,4a,5,8,8a,9,10,10a-dodecahydroanthracene (exo type). Upon completion of the reaction, the same aftertreatment was effected as in Example 17, providing a slightly yellow transparent polymer having a reduced viscosity of 0.54 with the conversion of 52.3%.

EXAMPLE 49

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-methyl-4-(5-bicyclo[2,2,1]hepta-2-enyl) phthalimide (exo type). Upon completion of the reaction, the same aftertreatment was applied as in Example 17, providing a slightly yellow transparent polymer having a reduced viscosity of 0.81 with the conversion of 72.6%.

EXAMPLE 50

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-(5-norborna-2-enyl) methyl maleimide (exo type).

Upon completion of the reaction, the same aftertreatment was effected as in Example 17, providing a slightly yellow transparent polymer having a reduced viscosity of 0.88 with the conversion of 80.3%.

EXAMPLE 51

Ring-opening polymerization was carried out in substantially the same manner as in Example 17, excepting that the N-methyl-3,6-methylene-1,2,3,6-tetrahydro-cis-phthalimide (exo type) used as a monomer in Example 17 was replaced by N-methyl-5-norborna-enyl-2-citraconimide (exo type). Upon completion of the reaction, the same aftertreatment was applied as in Example 17, providing a slightly yellow transparent polymer having a reduced viscosity of 0.79 with the conversion of 83.0%.

EXAMPLE 52

Ring-opening polymerization was conducted in substantially the same manner as in Example 17, excepting that the N-methyl-3,6-methylene-1,2,3,6-tetrahydro-cis-phthalimide (exo type) used as a monomer in Example 17 was replaced by N-methyl-5-norborna-2-enyl-glutaconimide (exo type). Upon completion of the reaction, the same aftertreatment was effected as in Example 17, providing a slightly yellow transparent polymer having a reduced viscosity of 0.74 with the conversion of 77.5%.

EXAMPLE 53

Ring-opening polymerization was undertaken in substantially the same manner as in Example 17, excepting that the n-methyl-3,6-methylene-1,2,3,6-tetrahydro-cis-phthalimide (exo type) used as a monomer in Example 17 was replaced by N-methyl-5-norborna-2-enyl-succinimide (exo type). Upon completion of the reaction, the same aftertreatment was applied as in Example 17, providing a slightly yellow transparent polymer having a reduced viscosity of 0.82 with the conversion of 85.6%.

EXAMPLE 54

Ring-opening polymerization was undertaken in substantially the same manner as in Example 17, excepting that the N-methyl-3,6-methylene-1,2,3,6-tetrahydro-cis-phthalimide (exo type) used as a monomer in Example 17 was replaced by N-methyl-5-norborna-2-enyl-phthalimide.

Upon completion of the reaction, the same aftertreatment was effected as in Example 17, providing a slightly yellow transparent polymer having a reduced viscosity of 0.89 with the conversion of 80.9%.

EXAMPLE 55

Ring-opening polymerization was carried out in substantially the same manner as in Example 17, excepting that the N-methyl-3,6-methylene-1,2,3,6-tetrahydro-cis-phthalimide (exo type) used as a monomer in Example 17 was replaced by N-methyl-5-norborna-2-enyl-naphthalene-1,8-dicarboxyimide (exo type). Upon completion of the reaction, the same aftertreatment was applied as in Example 17, providing a slightly yellow transparent polymer having a reduced viscosity of 0.71 with the conversion of 65.6%.

EXAMPLE 56

Ring-opening polymerization was conducted in substantially the same manner as in Example 17, excepting that the N-methyl-3,6-methylene-1,2,3,6-tetrahydro-cis-phthalimide (exo type) used as a monomer in Example 17 was replaced by N-methyl-5-norborna-2-enyl-naphthalene-2,3-dicarboxyimide (exo type). Upon completion of the reaction, the same aftertreatment was effected as in Example 17, providing a slightly yellow transparent polymer having a reduced viscosity of 0.63 with the conversion of 60.8%.

EXAMPLE 57

Ring-operating polymerization was carried out in substantially the same manner as in Example 17, excepting that 100 parts by weight of the N-methyl-3,6-methylene-1,2,3,6-tetrahydro-cis-phthalimide (exo type) used as a monomer in Example 17 were replaced by 100 parts by weight of a mixture of N-methyl-3,6-methylene-1,2,3,6-tetrahydro-cis-phthalimide (exo type) and cyclopentene (the molar ratio of the former to the latter is 8:2). Upon completion of the reaction, the same aftertreatment was applied as in Example 17, providing a slightly yellow transparent polymer having a reduced viscosity of 1.18 with the conversion of 92.3%.

EXAMPLE 58

Ring-opening polymerization was carried out in substantially the same manner as in Example 17, excepting that 100 parts by weight of the N-methyl-3,6-methylene-1,2,3,6-tetrahydro-cis-phthalimide (exo type) uses as a monomer in Example 17 were replaced by 100 parts by weight of a mixture of N-methyl-3,6-methylene-1,2,3,6-tetrahydro-cis-phthalimide (exo type) and bicyclo[2,2,1]-heptene-2 (the molar ratio of the former to the latter is 8:2). Upon completion of the reaction, the same aftertreatment was applied as in Example 17, providing a slightly yellow transparent polymer having a reduced viscosity of 1.35 with the conversion of 89.1%.

EXAMPLE 59

Ring-opening polymerization was carried out in substantially the same manner as in Example 17, excepting that 100 parts by weight of the N-methyl-3,6-methylene-1,2,3,6-tetrahydro-cis-phthalimide (exo type) uses as a monomer in Example 17 were replaced by 100 parts by weight of a mixture of N-n-butyl-3,6-methylene-1,2,3,6-tetrahydro-cis-phthalimide (exo type) and 5-cyano-bicyclo [2,2,1]-heptene-2 consisting of a mixture of the exo and endo isomer in which the ratio of the exo isomer to the endo isomer is 1:1 (the molar ratio of said phthalimide to the 5-cyano-bicyclo[2,2,1]-heptene-2 is 7:3). Upon completion of the reaction, the same aftertreatment was applied as in Example 17, providing a slightly yellow transparent polymer having a reduced viscosity of 1.42 with the conversion of 96.2%.

CONTROL 1

Ring-opening polymerization was conducted in substantially the same manner as in Example 17, excepting that the tungsten hexachloride used as a catalytic component in Example 17 was omitted (the catalytic system used consisted of diethyl aluminum chloride and acetaldehyde diethyl acetal). After the polymerization reaction, the same aftertreatment was applied as in Example 17, yet no polymer was obtained.

CONTROL 2

Ring-opening polymerization was carried out in substantially the same manner as in Example 17, excepting that the diethyl aluminum chloride used as a catalytic component in Example 17 was omitted (the catalytic system used consisted of tungsten hexachloride and acetaldehyde diethyl acetal). After the polymerization reaction, the same aftertreatment was effected as in Example 17, yet no polymer was obtained.

What we claim:

1. A method of polymerizing carbonimide norbornene derivatives to resinous or rubbery materials which comprises the ring-opening polymerization of carbonimide norbornene derivatives having at least one N-substituted cyclic carbonimide group in the presence of a catalytic system consisting of organic aluminum compounds and at least one compound comprising a metal selected from the group consisting of tungsten and molybdenum.

2. The method according to claim 1 where 1 mol of the carbonimide norbornene derivative is mixed with up to 1 mol of other cycloolefin and the ring-opening polymerization product is the copolymer of the two types of monomers.

3. The method according to claim 1 wherein said catalyst system is prepared by addition thereto at the rate of 0.1 to 6 mols for each mol of compound of tungsten or molybdenum of at least one compound selected from the group consisting of water, alkyl peroxides, aryl peroxides, alkyl hydroperoxides, aralkyl hydroperoxides, hydrogen peroxide, organic peracids, epoxides, organic halides, acetals, alcohols, phenols, orthoformic acid esters and orthocarboxylic acid esters.

4. The method according to claim 2 wherein said catalyst system is prepared by addition thereto at the rate of 0.3 to 3 mols for each mol of compound of tungsten or molybdenum of at least one compound selected from the group consisting of t-butyl peroxide, benzoyl peroxide, t-butyl hydroperoxide, cumene hydroperoxide, hydrogen peroxide, peracetic acid, ethylene oxide, propylene oxide, butene oxie, epichlorohydrin, allyl glycidyl ether, butadiene monoxide, allyl chloride, t-butyl chloride, α-chloroacetone, 2-chloroethanol, acetaldehyde dimethyl acetal, acetaldehyde diethyl acetal, diethoxy methane, acetone dimethyl acetal, dichloroacetaldehyde dimethyl acetal, methanol, ethanol, n-propanol, n-butanol, isobutanol, ethylene chlorohydrin, phenol, p-methyl phenol, p,p'isopropylidene diphenol, 2,6-dimethyl phenol, p-chlorophenol, 1,3-benzenediol, 1,3,5-benzene-triol, methyl orthoformate, ethyl orthoformate, ethyl orthoacetate, n-propyl orthopropionate, and butyl orthophenylacetate.

5. The method according to claim 1, wherein the ring-opening polymerization is carried out in the presence of an organic inert solvent.

6. The method according to claim 2 wherein the ring-opening polymerization is carried out in the presence of an inert organic solvent.

7. The method according to claim 3 wherein the ring-opening polymerization is carried out in the presence of an organic solvent.

8. The method according to claim 4 wherein the ring-opening polymerization is carried out in the presence of an inert organic solvent.

9. The method according to claim 1 wherein the organic aluminum compounds are selected from the group consisting of compounds represented by the general formulas $AlR_3$, $AlR_nX_{3-n}$ and a mixture of compounds represented by said general formula $AlR_3$ and water, in which the molar ratio of $H_2O$ to $AlR_3$ has a value of <1.5, where R is a radical selected from the group consisting of the alkyl radical, aryl radical and aralkyl radical, X is a radical selected from the group consisting of halogens, hydrogen and alkoxy radical, and $n$ is 1, 1.5 and 2.

10. The method according to claim 2 wherein the organic aluminum compounds are selected from the group consisting of compounds represented by the general formulas $AlR_3$, $AlR_nX_{3-n}$ and a mixture of compounds represented by said general formula $AlR_3$ and water, in which the molar ratio of $H_2O$ to $AlR_3$ has a value of <1.5, where R is a radical selected from the group consisting of the alkyl radical, aryl radical and aralkyl radical, X is a radical selected from the group consisting of halogens, hydrogen and alkoxy radical, and $n$ is 1, 1.5 and 2.

11. The method according to claim 3 wherein the organic aluminum compounds are selected from the group consisting of compounds represented by the general formulas $AlR_3$, $AlR_nX_{3-n}$ and a mixture of compounds represented by said general formula $AlR_3$ and water, in which the molar ratio of $H_2O$ to $AlR_3$ has a value of <1.5, where R is a radical selected from the group consisting of the alkyl radical, aryl radical and aralkyl radical, X is a radical selected from the group consisting of halogens, hydrogen and alkoxy radical, and $n$ is 1, 1.5 and 2.

12. The method according to claim 4 wherein the organic aluminum compounds are selected from the group consisting of compounds represented by the general formulas $AlR_3$, $AlR_nX_{3-n}$ and a mixture of compounds represented by said general formula $AlR_3$ and water, in which the molar ratio of H₂O to AlR₃ has a value of <1.5, where R is a radical selected from the group consisting of the alkyl radical, aryl radical and aralkyl radical, X is a radical selected from the group consisting of halogens, hydrogen and alkoxy radical, and $n$ is 1, 1.5 and 2.

13. The method according to claim 9 wherein compounds expressed by the general formula AlR₃ are selected from the group consisting of trimethyl aluminum, triethyl aluminum, tri-n-propyl aluminum, tri-isopropyl aluminum, tri-isobutyl aluminum, trihexyl aluminum, trioctyl aluminum, tribenzyl aluminum, and triphenyl aluminum.

14. The method according to claim 10 wherein compounds expressed by the general formula AlR₃ are selected from the group consisting of trimethyl aluminum, triethyl aluminum, tri-n-propyl aluminum, tri-isopropyl aluminium, tri-isobutyl aluminum, trihexyl aluminum, trioctyl aluminum, tribenzyl aluminum, and triphenyl aluminum.

15. The method according to claim 11 wherein compounds expressed by the general formula AlR₃ are selected from the group consisting of trimethyl aluminum, triethyl aluminum, tri-n-propyl aluminum, tri-isopropyl aluminum, tri-isobutyl aluminum, trihexyl aluminum, trioctyl aluminum, tribenzyl aluminum, and triphenyl aluminum.

16. The method according to claim 12 wherein compounds expressed by the general formula AlR₃ are selected from the group consisting of trimethyl aluminum, triethyl aluminum, tri-n-propyl aluminum, tri-isopropyl aluminum, tri-isobutyl aluminum, trihexyl aluminum, trioctyl aluminum, tribenzyl aluminum, and triphenyl aluminum.

17. The method according to claim 9 wherein the compounds expressed by the general formula $AlR_nX_{3-n}$ are selected from the group consisting of diethyl aluminum monochloride, di-n-propyl aluminum monochloride, diisobutyl aluminum monochloride, di-n-butyl aluminum monochloride, diethyl aluminum monobromide, diethyl aluminum monoiodide, diethyl aluminum monohydride, di-n-propyl aluminum monohydride, diisobutyl aluminum monohydride, dibenzyl aluminum monochloride, diphenyl aluminum monochloride, dibenzyl aluminum monobromide, ditolyl aluminum monochloride, diethyl aluminum monoethoxide, diisobutyl aluminum monobutoxide, ethyl aluminum sesquichloride, ethyl aluminum sesquibromide, isobutyl aluminum sesquichloride, ethyl aluminum dichloride, ethyl aluminum dibromide, propyl aluminum dichloride, isobutyl aluminum dichloride, ethyl aluminum diiodide, benzyl aluminum dichloride, benzyl aluminum dibromide, and ethyl aluminum diethoxide.

18. The method according to claim 10 wherein the compounds expressed by the general formula $AlR_nX_{3-n}$ are selected from the group consisting of diethyl aluminum monochloride, di-n-propyl aluminum monochloride, diisobutyl aluminum monochloride, di-n-butyl aluminum monochloride, diethyl aluminum monobromide, diethyl aluminum monoiodide, diethyl aluminum monohydride, di-n-propyl aluminum monohydride, diisobutyl aluminum monohydride, dibenzyl aluminum monochloride, diphenyl aluminum monochloride, dibenzyl aluminum monobromide, ditolyl aluminum monochloride, diethyl aluminum monoethoxide, diisobutyl aluminum monobutoxide, ethyl aluminum sesquichloride, ethyl aluminum sesquibromide, isobutyl aluminum sesquichloride, ethyl aluminum dichloride, ethyl aluminum dibromide, propyl aluminum dichloride, isobutyl aluminum dichloride, ethyl aluminum diiodide, benzyl aluminum dichloride, benzyl aluminum dibromide, and ethyl aluminum diethoxide.

19. The method according to claim 11 wherein the compounds expressed by the general formula $AlR_nX_{3-n}$ are selected from the group consisting of diethyl aluminum monochloride, di-n-propyl aluminum monochloride, diisobutyl aluminum monochloride, di-n-butyl aluminum monochloride, diethyl aluminum monobromide, diethyl aluminum monoiodide, diethyl aluminum monohydride, di-n-propyl aluminum monochloride, diisobutyl aluminum monohydride, dibenzyl aluminum monochloride, diphenyl aluminum monochloride, dibenzyl aluminum monobromide, ditolyl aluminum monochloride, diethyl aluminum monoethoxide, diisobutyl aluminum monobutoxide, ethyl aluminum sesquichloride, ethyl aluminum sesquibromide, isobutyl aluminum sesquichloride, ethyl aluminum dichloride, ethyl aluminum dibromide, propyl aluminum dichloride, isobutyl aluminum dichloride, ethyl aluminum diiodide, benzyl aluminum dichloride, benzyl aluminum dibromide, and ethyl aluminum diethoxide.

20. The method according to claim 12 wherein the compounds expressed by the general formula $AlR_nX_{3-n}$ are selected from the group consisting of diethyl aluminum monochloride, di-n-propyl aluminum monochloride, diisobutyl aluminum monochloride, di-n-butyl aluminum monochloride, diethyl aluminum monobromide, diethyl aluminum moniodide, diethyl aluminum monohydride, di-n-propyl aluminum monohydride, diisobutyl aluminum monohydride, dibenzyl aluminum monochloride, diphenyl aluminum monochloride, dibenzyl aluminum monobromide, ditolyl aluminum monochloride, diethyl aluminum monoethoxide, diisobutyl aluminum monobutoxide, ethyl aluminum sesquichloride, ethyl aluminum sesquibromide, isobutyl aluminum sesquichloride, ethyl aluminum dichloride, ethyl aluminum dibromide, propyl aluminum dichloride, isobutyl aluminum dichloride, ethyl aluminum diiodide, benzyl aluminum dichloride, benzyl aluminum dibromide, and ethyl aluminum diethoxide.

21. The method according to claim 9 wherein the mixture of compounds expressed by the general formula AlR₃ and water consists of triethyl aluminum and water mixed in the molar ratio of 1:0.5.

22. The method according to claim 10 wherein the mixture of compounds expressed by the general formula AlR₃ and water consists of triethyl aluminum and water mixed in the molar ratio of 1:0.5.

23. The method according to claim 11 wherein the mixture of compounds expressed by the general formula AlR₃ and water consists of triethyl aluminum and water mixed in the molar ratio of 1:0.5.

24. The method according to claim 12 wherein the mixture of compounds expressed by the general formula AlR₃ and water consists of triethyl aluminum and water mixed in the molar ratio of 1:0.5.

25. The method according to claim 1 wherein the compounds of tungsten are selected from the group consisting of tungsten pentachloride, tungsten hexachloride, tungsten pentafluoride, tungsten hexafluoride, tungsten oxytetrachloride, tungsten oxytetrabromide, tungsten oxydichloride, tungsten hexaalcoholate, tungsten hexaphenolate, tetrachlorotungsten diphenolate, tetrachlorotungsten dialcoholate, and $Al_4W_3Cl_{18}$.

26. The method according to claim 2 wherein the compounds of tungsten are selected from the group consisting of tungsten pentachloride, tungsten hexachloride, tungsten pentafluoride, tungsten hexafluoride, tungsten oxytetrachloride, tungsten oxytetrabromide, tungsten oxydichloride, tungsten hexaalcoholate, tungsten hexaphenolate, tetrachlorotungsten diphenolate, tetrachlorotungsten dialcoholate, and Al$_4$W$_3$Cl$_{18}$.

27. The method according to claim 3 wherein the compounds of tungsten are selected from the group consisting of tungsten pentachloride, tungsten hexachloride, tungsten pentafluoride, tungsten hexafluoride, tungsten oxytetrachloride, tungsten oxytetrabromide, tungsten oxydichloride, tungsten hexaalcoholate, tungsten hexaphenolate, tetrachlorotungsten diphenolate, tetrachlorotungsten dialcoholate, and Al$_4$W$_3$Cl$_{18}$.

28. The method according to claim 4 wherein the compounds of tungsten are selected from the group consisting of tungsten pentachloride, tungsten hexachloride, tungsten pentafluoride, tungsten hexafluroide, tungsten oxytetrachloride, tungsten oxytetrabromide, tungsten oxydichloride, tungsten hexaalcoholate, tungsten hexaphenolate, tetrachlorotungsten diphenolate, tetrachlorotungsten dialcoholate, and Al$_4$W$_3$Cl$_{18}$.

29. The method according to claim 1 wherein the compounds of molybdenum are selected from the group consisting of molybdenum pentachloride, molybdenum hexachloride, molybdenum pentafluoride, molybdenum hexafluoride, molybdenum pentabromochloride, molybdenum pentabromide, molybdenum oxytrichloride, molybdenum oxytetrachloride, molybdenum dioxyacetonate, dichloromolybdenum dialcoholate, and dichloromolybdenum triphenolate.

30. The method according to claim 2 wherein the compounds of molybdenum are selected from the group consisting of molybdenum pentachloride, molybdenum hexachloride, molybdenum pentafluoride, molybdenum hexafluoride, molybdenum pentabromochloride, molybdenum pentabromide, molybdenum oxytrichloride, molybdenum oxytetrachloride, molybdenum dioxydiacetyl acetonate, dichloromolybdenum diaclcoholate, and dichloromolybdenum triphenolate.

31. The method according to claim 3 wherein the compounds of molybdenum are selected from the group consisting of molybdenum pentachloride, molybdenum hexachloride, molybdenum pentafluoride, molybdenum hexafluoride, molybdenum pentabromochloride, molybdenum pentabromide, molybdenum oxytrichloride, molybdenum oxytetrachloride, molybdenum dioxydiacetyl acetonate, dichloromolybdenum dialcoholate, and dichloromolybdenum triphenolate.

32. The method according to claim 4 wherein the compounds of molybdenum are selected from the group consisting of molybdenum pentachloride, molybdenum hexachloride, molybdenum pentafluoride, molybdenum hexafluoride, molybdenum pentabromochloride, molybdenum pentabromide, molybdenum oxytrichloride, molybdenum oxytetrachloride, molybdenum dioxydiacetyl acetonate, dichloromolybdenum dialcoholate, and dichloromolybdenum triphenolate.

33. The method according to claim 5 wherein the organic solvents are selected from the group consisting of pentane, heptane, hexane, petroleum ethers, decane, benzene, toluene, xylene, cyclohexane, decalin, cyclooctane, methylene chloride, 1,2-dichloroethane, 1,1-dichloroethane, 1,2-dichloropropane, chloroform, chlorobenzene, diethyl ether and tetrahydrofuran.

34. The method according to claim 6 wherein the organic solvents are selected from the group consisting of pentane, heptane, hexane, petroleum ethers, decane, benzene, toluene, xylene, cyclohexane, decalin, cyclooctane, methylene chloride, 1,2-dichloroethane, 1,1-dichloroethane, 1,2-dichloropropane, chloroform, chlorobenzene, diethyl ether and tetrahydrofuran.

35. The method according to claim 7 wherein the organic solvents are selected from the group consisting of pentane, heptane, hexane, petroleum ethers, decane, benzene, toluene, xylene, cyclohexane, decalin, cyclooctane, methylene chloride, 1,2-dichloroethane, 1,1-dichloroethane, 1,2-dichloropropane, chloroform, chlorobenzene, diethyl ether and tetrahydrofuran.

36. The method according to claim 8 wherein the organic solvents are selected from the group consisting of pentane, heptane, hexane, petroleum ethers, decane, benzene, toluene, xylene, cyclohexane, decalin, cyclooctane, methylene chloride, 1,2-dichloroethane, 1,1-dichloroethane, 1,2-dichloropropane, chloroform, chlorobenzene, diethyl ether and tetrahydrofuran.

37. The method according to claim 1 which comprises further adding to the reaction system a molecular weight controlling agent selected from the group consisting of $\alpha$ olefins, internal olefins, conjugated diolefins, and nonconjugated diolefins.

38. The method according to claim 2 which comprises further adding to the reaction system a molecular weight controlling agent selected from the group consisting of $\alpha$-olefins, internal olefins, conjugated diolefins, and nonconjugated diolefins.

39. The method according to claim 3 which comprises further adding to the reaction system a molecular weight controlling agent selected from the group consisting of $\alpha$-olefins, internal olefins, conjugated diolefins, and nonconjugated diolefins.

40. The method according to claim 4 which comprises further adding to the reaction system a molecular weight controlling agent selected from the group consisting of $\alpha$-olefins, internal olefins, conjugated diolefins, and nonconjugated diolefins.

41. The method according to claim 1 wherein the ring-opening polymerization is carried out at a temperature ranging from −100° to +200°C.

42. The method according to claim 2 wherein the ring-opening polymerization is carried out at a temperature ranging from −100° to +200°C.

43. The method according to claim 3 wherein the ring-opening polymerization is carried out at a temperature ranging from −100° to +200°C.

44. The method according to claim 4 wherein the ring-opening polymerization is carried out at a temperature ranging from −100°C to +200°C.

45. The method according to claim 1 wherein the imide type norbornene derivatives are selected from the group consisting of N-substituted-3,6-methylene-1,2,3,6-tetrahydrocis-phtalimides, N-substituted-3,6-methylene-1-methyl-1,2,3,6-tetrahydro-cis-phthalimides, bicyclo [2,2,1]-hepta-2-ene-5-spiro-3′-(N-substituted succinimides), N-substituted-2-aza-1,3-dioxo-5,8-methano-1,2,3,4,4a,5,8,8a-octahydro-naphthalenes, N-substituted-5,8-methano-1,2,3,4,4a,5,8,8a-octahydronaphthalene-2,3-dicarboxy imides, N-substituted-5, 8-methano-2-methyl-1,2,3,4,4a,5,8,8a-octahydronaphthalene-2, 3-dicarboxy imides, 1,4-methano-1,4,4a,5,6,7,8,8a-octahydro-naphthalene-6-spiro-3′-(N-substituted succinimides), N-substituted-2-aza-1,3-dioxo-5,8-methano-1,2,3,4,4a,5,8,8a, 9,9a,10,-10a-dodecahydroanthracenes, N-substituted 1,4,5,8-dimethano-1,2,3,4,4a,5,8,8a-octahydronaphthalene-2,3-di-carboxyimides, N-substituted 1,4,5,8-dimethano-2-methyl-1, 2,3,4,4a,5,8,8a-octahydronaphthalene-2,3-dicarboxyimides, N-substituted 1,4,5,8-dimethano-1,4,4a,5,6,7,8,8a-octahydro-naphthalene-6-spiro-3-(N-substituted succinimides), N-substituted 2-aza-5,8,9,10-dimethano-1,3-dioxo-1,2,3,4,4,4a,5,8-,8a,9,9a,10,10a-dodecahydroanthracenes, N-substituted 4-(5-bicyclo[2,2,1]-hepta-2-enyl) phthalimides, N-[ω-(5-norborna-2-enyl) alkyl]maleimides, N-[ω-(5-norborna-2-enyl) alkyl] citraconimides, N-[ω-(5-norborna-2-enyl) alkyl] glutaconimides, N-[ω-(5-norborna-2-enyl) alkyl] succinimides, N-[ω-(5-norborna-2-enyl) alkyl] phthalimides, N-[ω-(5-norborna-2-enyl) alkyl] naphthalene-1,8-dicarboxyimides and N-[ω- (5-norborna-2-enyl) alkyl] naphthalene-2,3-dicarboxyimides.

46. The method according to claim 2 wherein the imide type nornornene derivatives are selected from the group consisting of N-substituted-3,6-methylene-1,2,3,6-tetrahydro-cis-phthalimides, N-substituted-3,6-methylene-1-methyl-1,2,3,6-tetrahydro-cis-phthalimides, bicyclo[2,2,1] -hepta-2-ene-5-spiro-3'-(N-substituted succinimides), N-substituted--2-aza-1,3-dioxo-5,8-methano-1,2,3,4,4a,5,8,8a-octahydronaphthalenes, N-substituted-5,8-methano-1,2,3,4, 4a,5,8,8a-octahydronaphthalene-2,3-dicarboxyimides, N-substituted-5,8-methano-2-methyl-1,2,3,4,4a,5,8,8a-octahydronaphthalene-2,3-dicarboxyimides, 1,4-methano-1, 4,5a,5,6,7,8,8a-octahydronaphthalene-6-spiro-3'-(N-substituted succinimides), N-substituted-2-aza-1,3-dioxo-5,8-methano-1,2,3,4,4a,5,8,8a,9,9a,10,10a-dodecahydro-anthracenes, N-substituted 1,4,5,8-dimethano-1,2,3,4,4a,5,8,8a-octahydronaphthalene-2,3-dicarboxyimides, N-substituted 1,4,5,8-dimethano-2-methyl-1,2,3,4,4a,5,8,8a-octahydronaphthalene-2,3-dicarboxyimides, N-substituted 1,4,5,8-dimethano-1,4,4a,5,6,7,8,8a-octahydronaphthalene-6-spiro-3 - (N-substituted succinimides), N-substituted 2-aza-5,8,9,10-dimethano-1,3-dioxo-1,2,3,4,4a,5,8,8a,9,9a, 10,10a-dodecahydroanthrancenes, N-substituted 4-(5-bicyclo [2,2,1]-hepta-2-enyl)phthalimides, N-[ω-(5-norborna-2-enyl) alkyl] maleimides, N-[ω-(5-norborna-2-enyl) alkyl] citraconimides, N-[ω-(5-norborna-2-enyl) alkyl] glutaconimides, N-[ω(5-norborna-2-enyl) alkyl] succinimides, N-[ω-(5-norborna-2-enyl) alkyl] phthalimides, N-[ω-(5-norborna-2-enyl) alkyl] naphthalene-1,8-dicarboxyimides and N-[ω-(5-norborna-2-enyl) alkyl] naphthalene-2,3-dicarboxyimides.

47. The method according to claim 33 wherein the imide type norbornene derivatives are selected from the group consisting of N-substituted-3,6-methylene-1,2,3,6-tetrahydro-cis-phthalimides, N-substituted-3,6-methylene-1-methyl-1,2,3,6-tetrahydro-cis-phthalimides, bicyclo [2,2,1]-hepta-2-ene-5-spiro-3'-(N-substituted succinimides), N-substituted-2-aza-1,3-dioxo-5,8-methano-1,2,3,4,4a,5,8,8a-octahydronaphthalenes, N-substituted-5,8-methano-1,2,3,4,4a, 5,8,8a-octahydronaphthalene-2,3-dicarboxyimides, N-substituted-5,8-methano-2-methyl-1,2,3,4,4a,5,8,8a-octahydronaphthalene-2,3-dicarboxyimides, 1,4-methano-1, 4,4a, 5,6,7,8,8a-octahydronaphthalene-6-spiro-3'-(N-substituted succinimides), N-substituted-2-aza-1,3-dioxo-5,8-methano-1,2,3,4,4a,5,8,8a,9,9a,10,-10a-dodecahydroanthracenes, N-substituted 1,4,5,8-dimethano-1,2,3,4,4a, 5,8,8a-octahydronaphthalene-2,3-dicarboxyimides, N-substituted 1,4,5,8-dimethano-2-methyl-1,2,3,4,4a,5,8,8a-octahydronaphthalene-2,3-dicarboxyimides, N-substituted 1,4,5,8-dimethano-1,4,4a,5,6,7,8,8a-octahydronaphthalene-6-spiro-3-(N-substituted succinimides), N-substituted 2-aza-5,8,9,10-dimethano-1,3-dioxo-1,2,3,4,4a,5,8,8a,9-,9a,10,10a-dodecahydroanthracenes, N-substituted 4-(5-bicyclo[2,2,1]-hepta-2-enyl) phthalimides, N-ω(5norborna-2-enyl) alkyl] maleimides, N-[ω-(5-norborna-2-enyl) alkyl] citraconimides, N-[ω-(5-norborna-2-enyl) alkyl] glutaconimides, N-[ω-(5-norborna-2-enyl) alkyl] succinimides, N-[ω-(5-norborna-2-enyl) alkyl] phthalimides, N-[ω-(5-norborna-2-enyl) alkyl] naphthalene-1,8-dicarboxyimides and N-[ω-(5-norborna-2-enyl) alkyl] napthalene-2,3-dicarboxyimides.

48. The method according to claim 4 wherein the imide type norbornene derivatives are selected from the group consisting of N-substituted-3,6-methylene-1,2,3,6-tetrahydro-cis-phthalimides, N-substituted-3,6-methylene-1-methyl-1,2,3,6-tetrahydro-cis-phthalimides, bicyclo [2,21]-hepta-2-ene-5-spiro-3'(N-substituted succinimides), N-substituted-2-aza-1,3-dioxo-5,8-methano-1,2,3,4,4a,5,8,8a-octahydronaphthalenes, N-substituted-5,8-methano-1,2,3,4,4a,5,8,8a-octahydronaphthalene-2,3-dicarboxyimides, N-substituted-5,8-methano-2-methyl-1,2,3,4,4a,5,8,8a-octahydronaphthalene-2,3-dicarboxyimides, 1,4-methano-1,4,4a,5,6,7,8,8a-octahydro-naphthalene-6-spiro-3'-(N-substituted succinimides), N-substituted-2-aza-1,3-dioxo-5,8-methano-1,2,3,4,4a,5,8,8a, 9,9a,10,-10a-dodecahydroanthracenes, N-substituted 1,4,5,8-dimethano-1,2,3,4,4a,5,8,8a-octahydronaphthalene-2,3-dicarboxyimides, N-substituted 1,4,5,8-dimethano-2-methyl-1,2,3,4,4a,5,8,8a-octahydronaphthalene-2,3-dicarboxyimides, N-substituted 1,4,5,8-dimethano-1,4,4a,5,6,7,8,8a-octahydronaphthalene-6-spiro-3-(N-substituted succinimides), N-substituted 2-aza-5,8,9,10-dimethano-1,3-dioxo-1,2,3,4,4a, 5,8,8a,9-,9a,10,10a-dodecahydroanthracenes, N-substituted 4-(5-bicycol [2,2,1]-hepta-2-enyl) phthalimides, N-[ω-(5-norborna-2-enyl) alkyl] maleimides, N-[ω-(5-norborna-2- enyl) alkyl] citraconimides, N-[ω-(5-norborna-2enyl) alkyl] glutaconimides, N-[ω-(5-norborna-2-enyl) alkyl] succinimides, N-[ω-(5-norborna-2-enyl) alkyl] phthalimides, N-[ω-(5-norborna-2-enyl) alkyl] naphthalene-1,8-dicarboxyimides and N-[ω-(5-norborna-2-enyl) alkyl] naphthalene-2,3-dicarboxyimides.

49. A method according to claim 2 wherein the other cycloolefins are selected from the group consisting of monocyclic olefins, nonconjugated cyclopolyenes, cyanosubstituted norbornene derivatives, carboxylic ester-substituted norbornene derivatives, halogen substituted norbornene derivatives, ether substituted norbornene derivatives, acid anhydride substituted norbornene derivatives, amide substituted norbornene derivatives, aromatic norbornene derivatives, aromatic dimethanooctahydronaphthalene derivatives, aromatic norbornadiene derivatives, bicyclo [2,2,1]-heptene-2, 5-methyl-bicyclo [2,2,1]-heptene-2, 1,4;5,8-dimethano-1,2,3,4, 4a,5,8,8a-octahydronaphthalene and methano-1, 4-hexacydro-1, 4,5,6,7,8-naphthalene.

* * * * *